US011487584B2

United States Patent
Khan et al.

(10) Patent No.: US 11,487,584 B2
(45) Date of Patent: Nov. 1, 2022

(54) RULE GENERATION AND TASKING RESOURCES AND ATTRIBUTES TO OBJECTS SYSTEM AND METHOD

(71) Applicant: Extreme Scale Solutions, Newark, DE (US)

(72) Inventors: Rishi Khan, Wilmington, DE (US); Petar Pirgov, Mantua, NJ (US); John Tully, Bear, DE (US); Douglas Danger Manley, Newark, DE (US); Mark Glines, Newark, DE (US); Ningjing Saponaro, Newark, DE (US); Samuel Kaplan, Media, PA (US)

( * ) Notice: Subject to any disclaimer, the term of this patent is extended or adjusted under 35 U.S.C. 154(b) by 780 days.

(21) Appl. No.: 16/435,426

(22) Filed: Jun. 7, 2019

(65) Prior Publication Data
US 2019/0377611 A1    Dec. 12, 2019

Related U.S. Application Data

(60) Provisional application No. 62/682,785, filed on Jun. 8, 2019.

(51) Int. Cl.
*G06F 9/50* (2006.01)
*G06F 9/48* (2006.01)
*G06N 5/02* (2006.01)

(52) U.S. Cl.
CPC .......... *G06F 9/5038* (2013.01); *G06F 9/4881* (2013.01); *G06N 5/025* (2013.01)

(58) Field of Classification Search
CPC ............................. G06F 9/5038; G06F 9/4881
See application file for complete search history.

(56) References Cited

U.S. PATENT DOCUMENTS

| | | | |
|---|---|---|---|
| 2008/0066072 A1* | 3/2008 | Yurekli | G06Q 10/06 718/104 |
| 2012/0303560 A1* | 11/2012 | Sedaghat | G06N 7/02 706/13 |
| 2013/0290536 A1* | 10/2013 | Dutta | G06F 9/5027 709/226 |

* cited by examiner

*Primary Examiner* — Dong U Kim
(74) *Attorney, Agent, or Firm* — Ellenoff Grossman & Schole LLP; James M. Smedley; Alex Korona

(57) ABSTRACT

Apparatus and associated methods relate to constructing a resource and attribute tasking solution to complete a user's objective with resource and attribute characteristics defining the tasked objects, in response to receiving a task definition, and satisfying a task definition constraint. An object includes of a set of resource and attribute dimensions each of which have a set of possible values. A tasking solution is the union of all valid solution vectors in the dimension space. The solution identifies all valid values to present to a user or other agent to make further decisions on further constraining resource and attribute characteristics for a final materializable tasking. In an illustrative example, the objective may be mapping resource supply to task demand. The task demand may be, for example, delivering a database-as-a-service platform configured based on rules generated to satisfy task definition capacity constraints. In some examples, the resource supply may include computing and communication resources configurable to provide access to the platform via a network cloud. Exemplary platforms delivered at different times may be configured with different resources and attributes, based on constructing a tasking solution determined from the available resource supply as a function of time. Various examples may advantageously provide optimized on-demand tasking solutions, configuring a user's available resource supply to complete the user's objective while satisfying task definition constraints.

36 Claims, 11 Drawing Sheets

RULE GENERATION AND TASKING RESOURCES AND ATTRIBUTES TO OBJECTS SYSTEM AND METHOD

CROSS REFERENCE TO RELATED APPLICATIONS

This application claims the benefit of US Provisional Patent Application No. 62/682,785, titled "SYSTEM AND METHOD FOR GENERATING RULES AND MODELING CAPACITY," filed by Applicants: Rishi Khan, Petar Pirgov, John Tully, Douglas Manley, Mark Glines, and Ningjing Saponaro, on Jun. 8, 2018.

This application incorporates herein by reference the entire content of the above-referenced application.

TECHNICAL FIELD

Various embodiments relate generally to tasking resources and attributes to objects.

BACKGROUND

Tasks are work units associated with a given objective. Tasking resources and attributes to objects is used in operations research, which includes both mathematics and engineering. A tasking solution assigns resources and attributes to the work units required to reach the objective. Tasks are completed by employing the assigned resources to perform the required work. In some examples, a task may be completed using a resource or attribute selected from various resource or attribute types having different characteristics and status.

Users of tasking solutions include individuals, organizations, computer applications, and electronic devices. Users may employ tasking to allocate resources and attributes to objects across an organizational structure or geographic region. Some tasking solutions are configured to satisfy requirements of an individual or organization. In an illustrative example, an organization having an objective to provide business intelligence services in the cloud may employ tasking to assign available computing, database, and communication resources to the objective. In some scenarios, tasking may construct a solution optimized to achieve an objective at reduced cost or in less time.

Characteristics and status governing tasking resource and attribute selection to complete a given task may include resource and attribute type, cost, performance, compatibility, interoperability, and availability. Some tasks may be specified with characteristics including time or cost. For example, an airline may need to assign aircraft, flight crew, maintenance staff, and fuel to a given task requiring passenger arrival in a specific location before a deadline. In such an example, a tasking process may construct a solution determined as a function of flight crew rest periods, maintenance schedules, aircraft speed, and aircraft locations. In various scenarios, some tasking processes may terminate without a solution, if a required resource or attribute is unavailable. In an illustrative example, a tasking process constructing an information technology task solution may consider resource characteristics such as, for example: application server parameters, including the number and speed of available processors; and, operating system compatibility with subsystems required by service deliverables. In some scenarios, a tasking process may not be able to construct a tasking solution to map existing resources and attributes to tasks without extensive computation, due to exponential growth in the solution space.

SUMMARY

Apparatus and associated methods relate to constructing a resource and attribute tasking solution to complete a user's objective with resource and attribute characteristics defining the tasked objects, in response to receiving a task definition, and satisfying a task definition constraint. An object includes a set of resource and attribute dimensions each of which have a set of possible values. A tasking solution is the union of all valid solution vectors in the dimension space. The solution identifies all valid values to present to a user or other agent to make further decisions on further constraining resource and attribute characteristics for a final materializable tasking. In an illustrative example, the objective may be mapping resource supply to task demand. The task demand may be, for example, delivering a database-as-a-service platform configured based on rules generated to satisfy task definition capacity constraints. In some examples, the resource supply may include computing and communication resources configurable to provide access to the platform via a network cloud. Exemplary platforms delivered at different times may be configured with different resources and attributes, based on constructing a tasking solution determined from the available resource supply as a function of time. Various examples may advantageously provide optimized on-demand tasking solutions, configuring a user's available resource supply to complete the user's objective while satisfying task definition constraints.

Various embodiments may achieve one or more advantages. For example, some embodiments may improve a user's access to resource and attribute tasking solutions. This facilitation may be a result of a rules engine configured to find the union of all valid resource and attribute variable choices. Various embodiments may reduce a user's effort finding an object tasking solution to a given task. Such reduced object tasking effort may be a result of a rules engine that limits the tasking solution search space such that only valid resource and attribute variable choices are considered. In some embodiments, a user's effort specifying the requirements constraining the solution constructed by a tasking process may be reduced. Such reduced user effort specifying requirements may be a result of a rules engine that permits a user to specify any requirement in any order. For example, various designs may be configured to permit a user to specify their real requirements, without limitation by a template or form requiring a specific requirement ordering.

In some examples, task solution quality may be improved. Such improved task solution quality may be a result of a tasking process adapted to find solutions based on modeling resources, attributes, and requirements as variables defined along one or more dimension, and generating logical rules to determine the union of all possible valid variable combinations satisfying rules given constraints. Various embodiments may improve the user's experience finding a resource and attribute tasking solution. This facilitation may be a result of a rules engine configured to permit a user to provide partial constraints, enabling selection of arbitrary dimensions while optimizing the search of valid remaining values. In some examples, various designs may find valid resource and attribute tasking solutions and invalid resource and attribute tasking solutions that could not previously be determined. This facilitation may be a result of a rules engine configured to posit as true each value of each dimension that is not yet determined as true or false, and determine what other values are reduced. In an illustrative example, an embodiment rules engine may continue to posit as true indeterminate conditions, until there is only one value for each dimension, or until there is a dimension that has no valid values (meaning the last hypothesized value for the previous dimension is not valid).

In some embodiments, the space complexity of a resource and attribute tasking process may decrease. Such decreased resource and attribute tasking process space complexity may be a result of a tasking process storing bitmapped valid values to represent the union of the enumeration of all solutions. Various designs may decrease tasking process time complexity to find a resource and attribute tasking solution. In some embodiments, decreased tasking process time complexity may be a result of a rules engine configured to adapt the search as a function of value distribution in the rules. For example, some embodiments may reorder dimensions based on occurrences in rule antecedents to reduce solution search space, first searching values that appear in rule antecedents, and searching last any values that never appear in rule antecedents. In various designs, decreased tasking process time complexity may be a result of a rules engine designed to stop checking rules when an invalid state is found. Some embodiments may decrease tasking process time complexity as a result of a rules engine configured to skip dimensions with all valid values, permitting the tasking process to avoid checking all possible solutions for such dimensions that will not expand the union of valid values.

In various embodiments, decreased tasking process time complexity may be a result of a rules engine implemented to skip dimensions with all valid values except those initially constrained by the request. In some designs, decreased tasking process time complexity may be a result of a rules engine designed to check only rules that could have fired, based on determining which rules have the current or previous value in the rule antecedent. In various examples, decreased tasking process time complexity may be a result of a rules engine adapted to skip remaining unbound values of dimensions after solving the first unbound value. For example, if a value does not appear in the antecedent of any rules, other unbound values will have the same solution space, and may be skipped. Some embodiments may decrease tasking process time complexity as a result of a rules engine that adds explicitly generated contrapositive rules, increasing the likelihood that the solution search space can be reduced based on values of dimensions that can be eliminated based on evaluating the contrapositive rules. In some embodiments, the effort required to create a request to a resource and attribute tasking process may be reduced. This facilitation may be a result of a tasking process designed to automatically validate requests based on including dimensions, values, and rules related by a tabular construct defining valid combinations. In an illustrative example, such a validated request construct may be rendered or visualized to create a simple view to review and discuss, while reducing the chance to make rules that are contradictory, or that may have unintended side-effects.

Some embodiments may improve the quality of requests to a resource and attribute tasking process. Such improved resource and attribute tasking process request quality may be a result of a tasking process designed to accept valid values as the negation of one or more values. In some designs, improved resource and attribute tasking process request quality may be a result of a tasking process configured to conditionally process constraints, based on adding an additional rule specifying if the constraint is applicable. Some examples may increase the efficiency of processing resource and attribute tasking requests, based on a tasking process designed to include hidden dimensions to guide the tasking process to select desirable solutions.

BRIEF DESCRIPTION OF THE DRAWINGS

Like reference characters in the various drawings indicate like elements.

DETAILED DESCRIPTION OF ILLUSTRATIVE EMBODIMENTS

Figure 1A:
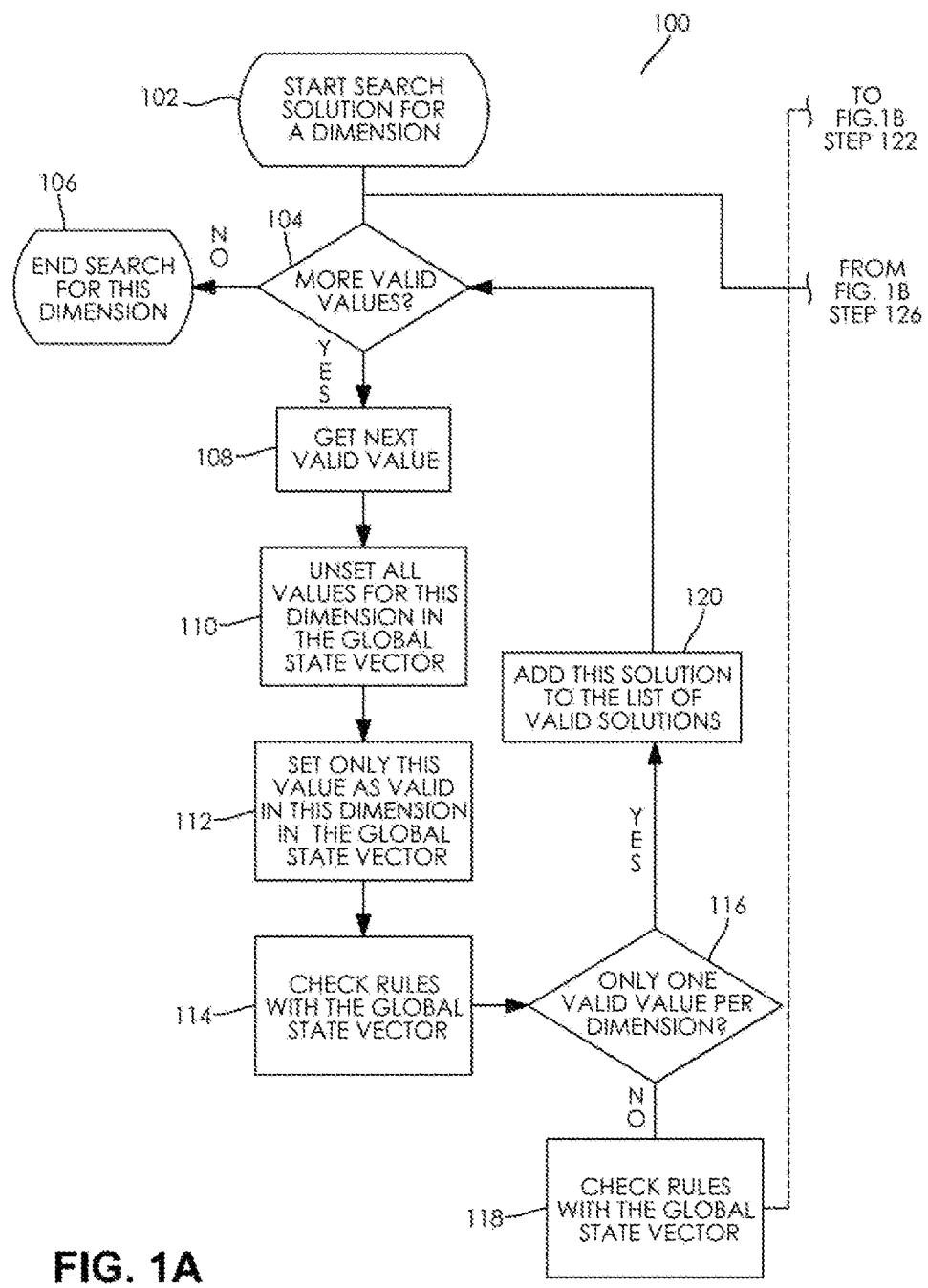
FIGS. 1A-1B together illustrate an exemplary process flow for a rules engine, in accordance with an embodiment of the present invention.

To aid understanding, this document is organized as follows. First, design and usage of various rules engine embodiment implementations with reference to FIGS. 1A-1B. Second, an exemplary parent-child (producer-consumer) relationship model is disclosed with reference to FIG. 2. With reference to FIGS. 3-6, the discussion turns to exemplary embodiments that illustrate various resource and attribute tasking implementations. Specifically, exemplary resource and attribute tasking system architecture and component designs are disclosed. Then, with reference to FIGS. 7A-7B, an illustrative usage workflow of an exemplary resource and attribute tasking embodiment is described. Finally, with reference to FIGS. 8-9, exemplary resource and attribute tasking system and network designs are disclosed.

Rules Engine

The following description details an exemplary method for determining the union of all possible valid combinations that satisfy rules given constraints.

In a preferred embodiment of the present invention, given a set of dimensions, valid values for those dimensions, rules relating valid combinations of the dimensions and values, and possible initial constraints, a system comprising an embodiment rules engine may be configured to return all possible values for any subset of the dimensions that meet the constraints and do not invalidate any of the rules. A valid solution of dimension-value tuples may comprise one value per dimension (that value possibly being a null value) such that none of the rules are violated. In various embodiments, an exemplary rules engine can be configured to return the union of all valid solutions. In a preferred embodiment, one improved feature of the rules engine may include an ability to specify constraints on the dimensions in any order and to provide partial constraints (e.g. two of five values of a dimension are valid). In some examples, such an ability may allow a user of the rules engine to make selections to arbitrary dimensions and navigate the valid remaining values until arriving at a final decision (e.g., with one value per dimension, or reasonable defaults).

In some embodiments, the dimensions of a resource or attribute to be tasked, the possible values of those dimensional characteristics, and the rules relating valid combinations of the dimensions and values are stored in a catalog file. The catalog file defines a catalog of valid resources and attributes that can be tasked.

One Possible Embodiment of Catalog File Format

According to an embodiment of the present invention, a catalog may be a file that holds the rules, dimensions, and values. A catalog file may comprise two sets of objects: (i) Dimensions; and (ii) Rules. One of ordinary skill in the art would appreciate that this is one possible format for a catalog file. It is provided as an example and is not a limitation in what could be specified.

Dimensions

According to an embodiment of the present invention, a dimensions key is a map of dimensions, or elements that can be set individually. In a preferred embodiment, for each key/value pair in this map:

The key may be a string representing a "short name" of a dimension, which may be used in a patterns and rules sections when referring to this dimension.

The value may be a map comprising the following key/value pairs:

name: The human readable "long name" of this dimension, which will be used in the interface presented to end users.

options: An array of single key/value pairs, representing the possible values this dimension can take. For each pair, the key is the short name, and the value is the long name. The values are assigned an enumeration based on their order in this array, so they can be compared using inequality operators. In an illustrative example, the values defined by an options array may represent a range of values the respective dimension can take.

options_url: A string value representing a URL that can be used by an external computer agent (such as a graphical user interface or a command line interface) to dynamically populate a list of options. The agent may be configured to pass all (or some) of the known restrictions to this URL using a request format (see section below). The options provided in the response may be included (e.g., verbatim) in the output instead of options.

Each dimension may include name, and one or more of options or options url.

Rules

A rules key is an array of rules, each of such rules being a valid "if" statement, that may be passed to a parser for processing. In a preferred embodiment, each statement takes one of two forms:

if condition then condition
if and only if condition then condition

In the second form, the implication is bidirectional. That is, if and only if A then B is equivalent to specifying both if A then B and if B then A.

In a preferred embodiment, there may be two types of basic conditions: equality tests, and set element tests. An equality test checks the relation between a dimension and a specific value, using an inequality. This takes the form:

dimension op value where op can be any inequality operation:

greater than or equal to ($\Leftarrow$)
less than or equal to ($\Leftarrow$)
greater than (>)
less than (<)
equal to (==)
not equal to (!=)

A set element test checks whether or not the dimension has a value in the given list. This can take the following forms:

dimension in [value,value, . . . ]
dimension not in [value,value, . . . ]

Complex conditions can be created using boolean operators:

not condition
condition1 and condition2
condition1 or condition2
condition1 xor condition2

In complex conditions, pieces can be grouped with parentheses to control precedence:

(condition 1 or condition2) and condition3
condition1 or (condition2 and condition3)

In an illustrative example, all of these complex conditions may be used in the if condition, but only and can be used in the then condition. For if and only if rules, only and can be used in either condition. In preferred embodiments, this limitation may be used to simplify the logic needed to deduce valid states.

Rules can also be separated into multiple clauses, to facilitate the writing of rules with complex conditionals. To do so, add a colon after the if condition, and put any additional conditions one level deeper in the tree. Each level of if conditions will be joined with a boolean and operation. The tree must end with a normal if/then rule, or a separate then condition. For example, the nested rule:

```
if A:
    if B:
        then X
    if C:
        if D then Y
``` is equivalent to the following two rules:
if (A) and (B) then X
if (A) and (B) and (C) and (D) then Y
where A, B, C, D, X, and Y are all valid conditions.

Default values

According to an embodiment of the present invention, defaults can be static or dynamic. In a preferred embodiment, static defaults may maintain the same ordering regardless of rules applied to other dimensions. For instance, to specify a static default, in the dimension specification, the system may include a key default, with one of the following values:

lowest: When the engine has removed all invalid options, the first-listed of the remaining options will be presented as the default.
highest: Similar to lowest, but with the last-listed as the default.
A sequence of values listed from most preferred to least preferred. If a value is not present in this list, it will never be the default.

Dynamic defaults may vary based on the results of other dimensions. For example, these default values can be manipulated through rules just like normal values. For instance, for a rule condition to set default values for dimension dim, use dim.default as the dimension name in the condition.

In preferred embodiments, dynamic defaults may override static defaults. If multiple dynamic defaults are valid, the one with the highest static ordering (if any) may be the default. In this case, if there are no static defaults, no default will be presented. If there is exactly one valid dynamic default, it will be presented as the default, regardless of the static defaults or absence thereof.

Resolving Undetermined Dimensions using Defaults

In various scenarios illustrative of the design and usage of some rules engine embodiments, a tasking request may specify to the rules engine that all unresolved dimensions (that is, dimensions that still have more than one possible value) be resolved by the default policies of those dimensions instead of requiring input from a user and further tasking requests. In an illustrative example, if this option is specified, the rules engine will first run the tasking solution without this requirement to determine the union of all valid values for the dimensions. For each dimension that has multiple valid values and a default policy, the rules engine sets the value based on the default policy, and recalculates the tasking solution given the current solution and the new default setting as the initial constraints. This will resolve any invalid value combinations resulting from the default policy setting. For each dimension that has multiple valid values and no default policy, the rules engine sets the value based on any policy. In some embodiments, the policy could be a global catch-all default policy used with all tasking requests. In some embodiments, the policy could be lowest value, highest value, or random value.

In some embodiments, the order of dimension resolution may be specified in the catalog file. In an illustrative example, if there is no dimension resolution order, the rules engine may resolve them in any order.

In some scenarios, various embodiments' ability to advantageously resolve undetermined dimensions may provide value and differentiation from the state of the art, because a user may wish to provide a minimal subset of parameter specifications and constraints and have the rules engine determine a valid solution without further interaction.

Finding solutions given an inequality constraint on numeric dimensions

In some scenarios exemplary of the design and usage of various rules engine embodiments, a tasking request may include an inequality as a constraint (for example, cpu_count>1.5, or an inequality operation such as <, <=, >, >=) instead of an explicit value of a dimension (for example cpu_count is 2), an explicit set of values of a dimension (for example cpu_count is 2,4, or 6), or explicit negation of a set of values (for example cpu_count !=2 or 4). In an illustrative example, if a dimension is an enumeration, and if the values of enumeration are numeric, the rules engine will evaluate all of the values, determine which values satisfy the inequality, and create a set out of those. Then, the rules engine will run the tasking solution to determine the valid values of all dimensions. In some embodiments, the tasking request may also ask for unresolved dimensions to be resolved using the defaults as described above.

In some embodiments, the order of dimension resolution may be the order of inequality constraints given in a tasking request. In various implementations, the order of dimension resolution may be specified in a catalog file.

In various exemplary scenarios, some embodiments' ability to advantageously provide an inequality constraint may provide value and differentiation from legacy techniques. In an illustrative example, if a user has a previous object that he wishes to replace with a new object (for example, the resources and attributes of which are constrained by this rules engine), he can specify what he already has (for example, perhaps resized to meet technology changes) and automatically construct a fully specified new object.

Catalog File Example

```
dimensions:
  platform:
    name: Platform
    default: lowest
    options:
      - tier1: Tier 1
      - tier2: Tier 2
      - tier3: Tier 3
  db_type:
    name: Database Type
    default: [mssql, oracle]
    options:
      - oracle: Oracle
      - mssql: Microsoft SQL Server
  db_version:
    name: Database Version
    options:
      - o11g: Oracle 11g
      - o12c: Oracle 12c
      - o12cpdb: Oracle 12c Pluggable
      - m2012: MSSQL 2012
      - m2014: MSSQL 2014
    rules:
      - if db_type == oracle then db_version in [o11g, o12c, o12cpdb] and db_version.default == o12c
      - if db_type == mssql then db_version in [m2012, m2014] and db_version.default == m2014
  os:
    name: Operating System
    options:
      - win: Windows
      - linux: Linux
    rules:
      - if and only if db_type == mssql then os == win
      - if and only if db_type == oracle then os == linux
  num_cpu:
    name: Number of CPUs
    options:
      -1: 1 CPU
      -2: 2 CPUs
      -3: 3 CPUs
      -4: 4 CPUs
    rules:
      - if db_type == oracle:
        - if db_version == o11g then num_cpu >= 2
        - if db_version in [o12c, o12cpdb] then num_cpu == 4
```

One Possible Embodiment of Request Format

According to an embodiment of the present invention, a request to the rules engine may include two things, both of which are optional:

known: A map of dimensions to their valid values. In an illustrative example, keys in this map may be a valid dimension name. Each value can be an array of valid options for that dimension. This limits the initial search space. If known is not provided, everything may be considered valid in the initial state.

wanted: An array of strings representing dimensions whose values should be returned after search is complete. If wanted is not provided, dimensions are returned.

For example
known:
  platform:
    -tier1
  num_cpu:
    -2
    -3
  os:
    -linux One possible embodiment of response From the examples above, the result of knowing that platform is tier 1, os is linux, and num_cpu is 2 or 3.
platform:
  name: Platform
  options:
    -"tier 1": "Tier 1"
  default: tier 1
db_type:
  name: Database Type
  options:
    -"oracle": "Oracle"
  default: oracle
db version:
  name: Database Version
  options:
    -"o11g": "Oracle11g"
os:
  name: Operating System
  options:
    -"linux": "Linux"p0 num_cpu:
  name: Number of CPUs
  options:
    -"2": "2 CPUs"
    -"3": "3 CPUs"

In this example, because the OS is linux, the Database Type must be Oracle. Because the database type is Oracle, the Database Version must be Oracle 11g, Oracle 12c, or Oracle 12c Pluggable. However, since the number of CPUs is 2 or 3, the Database Version cannot be Oracle 12c, or Oracle 12c Pluggable.

A normal rules engine would not be able to deduce the last reduction of database version because there is no rule explicitly saying that Oracle 12c is not a valid database version. However, there is a rule if db_version in [o12c, o12cpdb] then num_cpu ==4 which would force the number of cpus to be 4 if this were the case. Since num_cpu cannot be 4, these values are not valid. It is possible that a preprocessing step to deduce contrapositives from the rules could deduce this case. However, this is not always possible (i.e. if A and B then C has a contrapositive if not C then not A or not B which is not reducible).

Differentiation of Rules Engine

In various exemplary scenarios, a prior art rules engine may apply all of the rules based on what is known at the time, but skip rules whose conditions are currently indeterminate. Further, such a prior art rules engine may typically only return the known determined dimensions. In an illustrative example, an embodiment rules engine in accordance with the present disclosure may go a step further, and for each value of each dimension that is not yet determined as true or false, attempt to posit that the value is true or false, and determine what other values are reduced. This continues until there is only one value for each dimension or a dimension has no valid values (meaning the last hypothesized value for the previous dimension is not valid).

Naïve Implementation

In various examples, the simplest implementation may take each dimension one at a time, try all remaining valid values, determine if any rules reduce the search space, and continue to the next dimension values until all values are exhausted. When a valid set of values are found all dimensions (i.e. every dimension has one value and all rules are satisfied), it is added to the list of possible solutions. When all solutions are found, the union of the solutions is returned. Below is some pseudocode for a naïve implementation:

```
def search_solutions(current_values, dimensions, current_dimension):
  for value in valid_values(dimension[current_dimension]):
    current_values[current_dimension] = value
    check_rules(rules, dimensions, current_values)
    if not check_still_valid(current_values): continue
    if check_complete(current_values):
      valid_solutions.add(current_values)
      continue
    search_solutions(current_values, dimensions, current_dimension+1)
```

In the above code, check_rules will find the rules whose antecedents are true and apply any reductions to the dimension space in the consequent of those rules. check_still_valid checks to ensure that each dimension still has at least one value. If any dimension has no value, then the last chosen value in current_values was not a valid hypothesis. check_complete checks if all dimensions have one and only one value. In this case the system has reached the bottom of the recursion tree and have found a valid solution. Finally, if the current_values are still valid but are not complete, choose the next dimension and start enumerating it's values in a similar way.

Figure 1B:
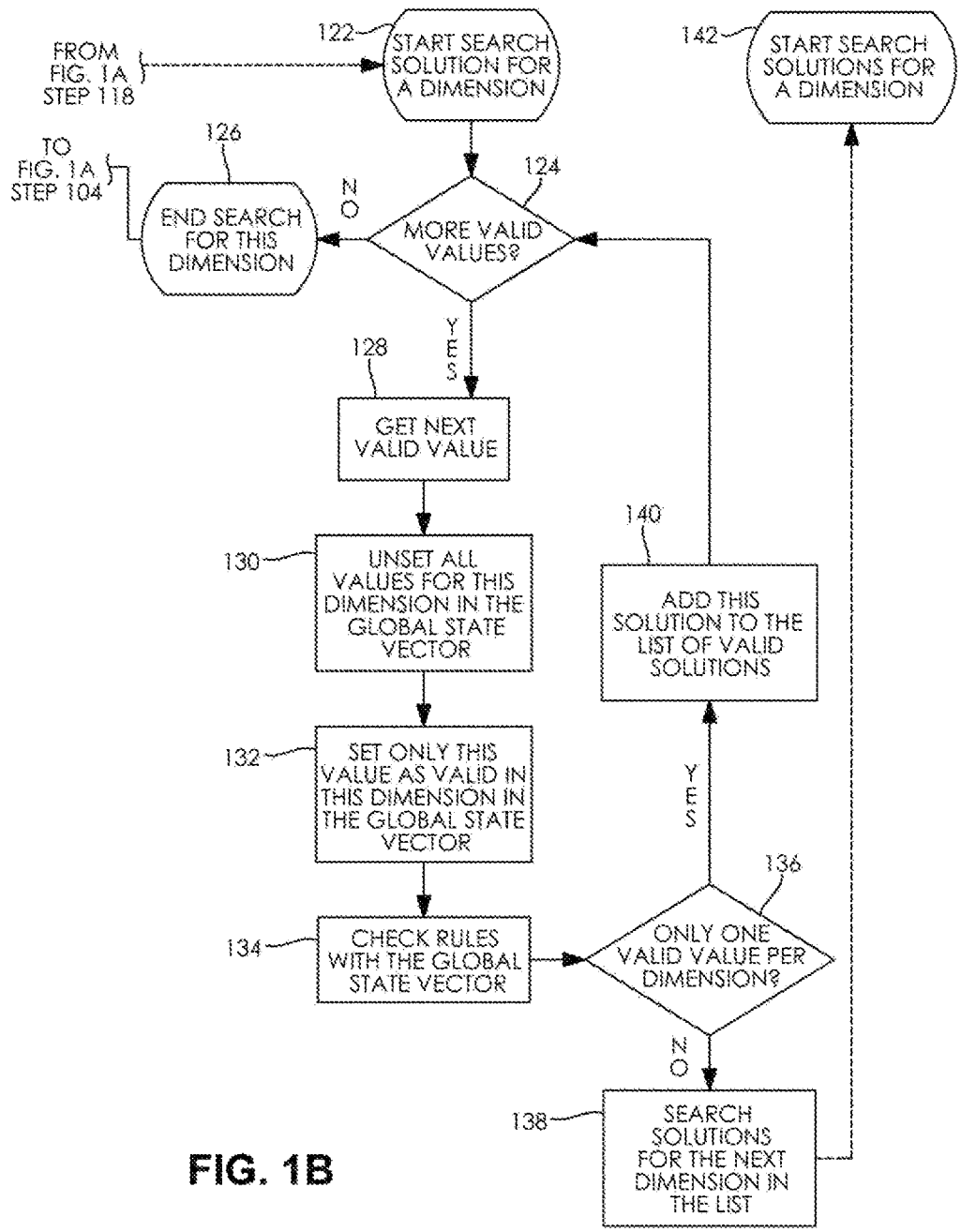

The above code is represented in FIGS. 1A-1B and further described with reference to FIG. 8.

The naïve solution, while easy to understand, suffers from a combinatorial explosion of computation and memory (to hold the solutions). Assuming there are no initial known constraints, the number of enumerations is on the order of $\Pi_{d \in dimensions}$ degree(d). For a small problem with ten dimensions and ten values each would require $10^{10}$=10,000,000,000 enumerations.

Optimizations

Memory Optimization

The goal of the rules engine is to return the remaining possible valid values, which is the union of the enumeration of all solutions. Therefore, an optimization for memory is to only store the union of the enumerations. In some embodiments this would keep the set of valid values for each dimension. Since the number of total values for each dimension is known, a more memory efficient embodiment would be a bitmap containing 1 for a valid value and 0 for a currently invalid value. As solutions are found, they can be added to the set of valid values. In this way, the memory requirements of a small problem with ten dimensions and ten values each can be reduced from $10^{10}$=10,000,000,000 solutions to 10*10=100 bits.

Computational Optimizations

Reorder dimensions based on occurrences in rule antecedents

Rules that can fire reduce the search space. Therefore, it is beneficial to first search values that appear in the antecedents of the rules. Values that never show up in rule antecedents do not reduce the search space and should be searched last. The most optimal values to search first are those that appear alone in the rule antecedent (i.e. there is only one condition in the antecedent) and have multiple reductions in the consequent (i.e. the rule reduces a lot of dimensions). In one embodiment, dimensions are ordered by the number of occurrences of a dimension in the antecedents of the rules. In another embodiment, if a dimension appears in the antecedent of a rule along with other dimensions, that occurrence is down-weighted by the number of dimensions in the antecedent (i.e. if two dimensions appear in a rule antecedent, each is weighted by ½; if three dimensions appear, the weight is ⅓, etc.).

Stop Checking Rules When an Invalid State is Found

If at any point in the rule checking, the system comes across a rule that has a true antecedent, but the consequent reduces all of the valid values out of a dimension, the system knows it has reached a dead end. The system can stop checking rules and return that the state that was tested is invalid.

Skip Dimensions with all Valid Values

When all of the values of a dimension are valid, the system does not need to keep checking all possible values for it. Instead, when the system pops up to the level of that dimension, the system can reorder the dimensions such that it is at the bottom of the list. In a preferred embodiment, the reordering of the dimensions pushes a dimension down the list, but above the previously pushed dimensions. That is, the first dimension to be reordered will be at the bottom of the list. The second dimension to be reordered will be at the second to bottom of the list, and so on. In this way, dimensions that 'quickly' fill up are at the bottom and are more likely to resolve to a materialized dimension. This has been verified by empirical simulations. When the system reaches the level of dimensions that have all valid values found, the system needs only to find one solution and the system can skip all other solutions for those dimensions (because they will not add to the union of valid values). Below is pseudocode describing when the reordering is done:

```
def search_solutions(current_values, dimensions, current_dimension):
    if dimension_full(current_dimension, dimensions):
        return_value = IS_FULL
    for value in valid_values(dimension[current_dimension]):
        current_values[current_dimension] = value
        check_rules(rules, dimensions, current_values)
        if not check_still_valid(current_values): continue
        if check_complete(current_values):
            valid_solutions.add(current_values)
            return_value = return_value | IS_MATERIALIZED
            if dimension_full(current_dimension, dimensions):
                return return_value
            continue
        status = search_solutions(current_values, dimensions,
            current_dimension+1)
        if (status == IS_MATERIALIZED| IS_FULL)
        && dimension_full(current_dimension, dimensions):
            return_value = return_value | IS_MATERIALIZED
            return return_value
    if all_values_valid(valid_solutions, current_dimension):
        reorder_dimensions(dimensions, current_dimension)
```

All_valid_values returns true if all of the values of the current dimension have been recorded in valid solutions. reorder_dimensions pushes the current dimension to the bottom of the list of dimensions if it is not already pushed down previously. IS_MATERIALIZED is an attribute signifying all of the dimensions that one valid value. IS_FULL is an attribute signifying that the current dimension is full, so the system does not need to test any more values.

In other embodiments, when all of the values of a dimension are valid, the dimension can be reordered to any position between the bottom of the list and directly above the previously pushed dimensions. In one embodiment the order of the pushed dimensions can be ordered such that they retain the order relative to each other that they had during the initial order based on occurrences in rule antecedents.

Skip dimensions with all valid values given constraints

If the input constraints (i.e. known in the request format embodiment above) constrain a dimension's valid values, the system can modify all_valid_values to return true if all of the values, except those initially constrained, of the current dimension have been recorded in valid solutions.

Check Only the Rules that Could Have Fired

Let us map the rules to values such that if a rule has a value in its antecedent, it is mapped to the value. In this way, in check_rules, the system knows the only thing that changed is the current value in a dimension was set and the previous value was unset. Therefore, the system only needs to look at rules where current or previous value is in the antecedent. Further, as rules fire, new values are reduced and rules that contain those values should be checked until no rules fire.

After solving the first unbound value, skip remaining unbound values of dimension In a specific dimension, if a value does not appear in the antecedent of any rules (i.e. it is unbound), other unbound values will have the same solution space (only with a different value for this dimension). Therefore, after finding solutions of the first unbound value in a dimension, the system can skip other unbound values of this dimension. If a solution was found for the first unbound value, the other unbound values can be marked as valid. If a solution was not found for the first unbound value, the other unbound values can be marked as invalid.

Explicitly Fenerate Contrapositives

In a preferred embodiment, for any rule: "if antecedent then consequent", there is a corresponding logically equivalent contrapositive logical statement "if not consequent then not antecedent". This is called the law of contrapositive or the modus tollens rule of inference. For example, the statement 'If an animal is a cat, then it is a mammal' is logically equivalent to 'if an animal is not a mammal, then it is not a cat'. In this case, both statements are true.

According to an embodiment of the present invention, the rule engine can be configured to derive correct results without contrapositive rules. However, adding contrapositive rules can significantly speed up the computation because it reduces the search space dramatically. Further, the addition of these rules do not increase the amount of time doing rule checking because there is an optimization that only checks rules that could have fired by looking at the values that changed from the previous search and only testing rules that contain that value change.

Consider Rules of the Form:

if dimensionA==value1 then dimensionB==valueX and dimensionC==valueY . . .

where the antecedent is always one condition, and the consequent is one or more reductions concatenated with and operators. The contrapositive of this form of rule is:

if not (dimensionB==valueX and dimensionC==valueY . . . ) then dimensionA !=value1

DeMorgan's Law States in Boolean Logic $$\neg[p \wedge q] \equiv \neg p \vee \neg q$$

In English, not(A and B)=not(A) or not(B). Extending this law, not(A and B and C . . . )=not(A) or not(B) or not(C) . . . So the above can be rewritten as:

if dimensionB!=valueX or dimensionC !=valueY or . . . then dimensionA !=value1

Further if A or B then C can be split into multiple statements: if A then C, if B then C. So the above can be simplified to:

```
if dimensionB!=valueX then dimensionA != value1
if dimensionC!=valueY then dimensionA != value1
if ...           then dimensionA != value1
```

In addition, the contrapositive of other implication rules can be determined by standard methods. In an illustrative example, various embodiments may use contrapositive generation as an optimization so that valid values of dimensions can be reduced faster.

Simplified Rules Generator

While it is possible to create dimensions, values, and rules for the rules engine by hand, it is often the case that rules fit within a tabular scheme in the following way:

A set of dimension names are column headers

For each dimension, a row is created that contains zero or more valid dimensions for each dimensional column (where an empty field means that dimension is not part of the rule)

The row specifies that this combination of values for the specified dimensions is valid All other combinations are invalid For example:

| Template | cpu | mem |
|---|---|---|
| small | 2 | 16 |
| medium | 4 | 16, 32 |
| large | 8 | 64 |

In this case, if template is small, then cpu must be 2 and mem must be 16. But if template were medium, mem could be 16 or 32. Alternatively, if cpu is 8, template must be large and mem must be 64.

Additionally, tables can be conditioned on a set of other dimension/value combinations. For example, the above table may only be valid for database_engine=oracle and the system could have another table for another database_engine value. This format is much more conducive to architects and teams because it creates a simple view to review and discuss. It also makes it much harder to make rules that are contradictory or have unintended side-effects.

Rule Generation

Rule generation must satisfy a table's implicit constraints. One might think the rules generated from the above example would be:

```
if template==small then cpu=2 and mem=16
if template==medium then cpu=4 and mem in [16,32]
if template==large then cpu=8 and mem=64
```

The problem with this set of rules is that there is nothing which says that template is restricted to being small, medium, or large. If a different value of template, such as extra_small, and a different value of cpu, such as 16, were defined elsewhere, then cpu=16 and template=extra_small would be a valid (but likely unwanted) combination of options.

Hidden Dimensions to Satisfy Tabular Constraints

To address the above problem, the system may be configured to create a hidden dimension for each table. This dimension has one value for each row of the table. The value could be numerical or any other enumeration. For purposes of illustration, the value may be numerical starting at 1. For the above example, a new hidden dimension _table_1_id is created with values 1, 2, and 3. The name of the hidden dimension is also not important, but prefixing the name with _table_ and suffixing it with the current table makes it easy to see the hidden dimensions, programmatically determine names, and quickly identify the table these rules apply to.

The dimension and value definitions would look like this:

```
_table_1_id:
  name: _table_1_id
  options:
  -'1': '1'
  -'2': '2'
  -'3': '3'
```

The following rules are created:

```
if _table_1_id == 1 then template==small and cpu==2 and mem==16
if _table_1_id == 2 then template==medium and cpu==4 and mem in [16,32]
if _table_1_id == 3 then template==large and cpu==8 and mem==64
```

Allow for negation of values and empty values

Sometimes it is helpful to express valid values in a table as the negation of one or more values. For example:

| Platform | disaster_recovery | exadata_server_count |
|---|---|---|
| !exadata | | n/a |
| Exadata | no | 1 |
| Exadata | yes | 2 |

The first row in the example above expresses 'for all platforms except exadata, the exadata_server_count is n/a (i.e. not applicable).' Notice that the disaster_recovery dimension is not considered here because there is no value in that column.

The second row expresses that 'for exadata platforms, if disaster recovery is not required, the exadata_server_count is 1.' The third row expresses 'for exadata platforms, if disaster recovery is required, the exadata_server_count is 2.'

As above in the hidden dimension section, these would be translated as:

```
_table_2_id:
  name: _table_2_id
  options:
  -'1': '1'
  -'2': '2'
  -'3': '3'
  if _table_2_id == 1 then platform not in [exadata] and
  exadata_server_count==na
  if  _table_2_id == 2  then platform==exadata
  and  disaster_recovery==no   and exadata_server_count==1
  if  _table_2_id == 3  then platform==exadata
  and  disaster_recovery==yes  and exadata_server_count==2
```

Conditional Table Rule Generation

A conditional table is a table whose constraints only apply under a given condition.

For example:
if database_type==oracle then

| Template | cpu | mem |
|----------|-----|-----|
| Small | 2 | 16 |
| Medium | 4 | 16, 32 |
| Large | 8 | 64 |

In this case, the rules should only apply if database_type is oracle.

This can be handled by modifying the hidden dimension to have an extra value of 'not applicable' like this:

```
_table_3_id:
    name: _table_1_id
    options:
    -'na': 'Not Applicable'
    -'1': '1'
    -'2': '2'
    -'3': '3'
```

In this example, one extra rule may be added that specifies whether the table applies like this:
if database_type==oracle then_table_3_id !=na Next, the system may add the table condition to the consequent of the rules like this:

```
if _table_3_id == 1 then database_type==oracle and template==small
    and cpu==2 and mem==16
if _table_3_id == 2 then database_type==oracle and template==medium
    and cpu==4 and mem in [16,32]
if _table_3_id == 3 then database_type==oracle and template==large
    and cpu==8 and mem==64
```

If the table condition is not met, the _table_X_id value will be na. If the table condition is met, it will be one of the three numerical values and thus constrain the template, cpu, and mem dimensions appropriately.

Explicitly Generate Contrapositives

According to a preferred embodiment of the present invention, for any rule: "if antecedent then consequent," there is a corresponding logically equivalent contrapositive logical statement "if not consequent then not antecedent." This is called the law of contrapositive or the modus tollens rule of inference. For example, the statement 'If an animal is a cat, then it is a mammal' is logically equivalent to 'if an animal is not a mammal, then it is not a cat.' In this case, both statements are true.

In preferred embodiments, the rule engine can be configured to derive correct results without contrapositive rules. However, adding contrapositive rules can significantly speed up the computation because it reduces the search space dramatically. And the addition of these rules do not increase the amount of time doing rule checking because there is an optimization that only checks the rules that could have fired by looking at the values that changed from the previous search and only testing rules that contain that value change.

All of the rules generated by the simplified rules generator are of the form:
if dimensionA==value1 then dimensionB==valueX and dimensionC==valueY ...

Where the antecedent is always one condition, and the consequent is one or more reductions concatenated with and operators. The contrapositive of this form of rule is:
if not (dimensionB==valueX and dimensionC==valueY ... ) then dimensionA !=value1

DeMorgan's Law states in boolean logic.

$\neg[p \wedge q] = \neg p \vee \neg q$

In English, not(A and B)=not(A) or not(B). Extending this law, not(A and B and C ... )=not(A) or not(B) or not(C) ... So the above can rewritten as:
if dimensionB!=valueX or dimensionC !=valueY or ... then dimensionA !=value1

Further if A or B then C can be split into multiple statements: if A then C, if B then C. So the above can be simplified to:

```
if dimensionB!=valueX then dimensionA != value1
if dimensionC!=valueY then dimensionA != value1
if ...           then dimensionA != value1
```

Integrated Capacity Management

According to an embodiment of the present invention, herein are provided methods to map demand to supply by modeling the supply as a hierarchy of objects with resources and attributes, and expressing the demand resources and attributes and required attributes in terms of the supply model capable of managing reserved and provisioned capacity. Further, in accordance with certain embodiments of the present invention, herein further are provided methods to propose supply to purchase to meet demand.

Modeling Supply

For the purposes herein, consider a model where an object has resources it consumes, resources it produces, and attributes of the object. An object that has resources that it produces will be referred to as a "producer," and an object that has resources that consume others will be referred to as a "consumer." An object may be both a producer and a consumer. Producers can require that consumers have specific attributes directly (the attributes are present on the consumer) or indirectly (the attributes are present on another producer that the consumer is consuming). Consumers can require that producers have specific attributes directly (the attributes are present on the producer) or indirectly (the attributes are present on another producer that the producer is consuming).

Some examples of objects in a hierarchy that could be used for modeling databases:

Data center object
   has attributes:
      name
      region
      country
      state/province [optional]
      city
   produces resources:
      floor space
Cabinet object
   has attributes:
      rack name
      lifecycle environment [i.e. prod/non-prod]
      data security level
      line of business [optional; if one LOB owns this]
   consumes resources:
      floor space
   produces objects:
      8 compute node objects produces resources:
    data storage
        requires data security level isolation of any consumers
compute node object
    has resources:
        cpu cores
        memory
container database instance (CDB)
    has attributes:
        name
        line of business [optional; if databases inside are only for one line of business]
        application id [optional; if databases inside are only for one application]
        database type [i.e. Oracle, MySQL, MSSQL, etc.]
    Consumes resources:
        compute node cpu cores
        compute node memory
        cabinet storage
    produces resources:
        cpu cores
        memory
    places requirements on any consumers:
        storage,cpu cores,memory: lifecycle environment
        storage,cpu cores,memory: datacenter [optional]
        storage: data security level
        pu cores,memory: line of business [optional]
pluggable database (PDB)
    has attributes:
        line of business
        application id
        lifecycle environment
        name
        database type
    consumes resources:
        database instance cpu cores
        database instance memory
        cabinet storage (in some databases, the instance provides the memory)
    places requirements on any producers:
        data center
        lifecycle environment
        line of business [if this database requires it]
        application id [if this database requires it]

Other examples of hierarchies that could be modeled include (but are not limited to):
development
    building
        unit
            tenant
hotel
    rooms
        customers
delivery trucks
    packages
airplanes
    passengers In each of these cases, the producers have attributes and isolation requirements (i.e. hotels and buildings have locations and prices, airplanes and trucks have source/destination) and provide resources (i.e. buildings and hotels have units/rooms, airplanes have seats, trucks have space). The consumers have attributes and isolation requirements (i.e. people need to stay in certain places, boxes and people need to get to places) and consume resources (i.e. take up space).

Figure 2:
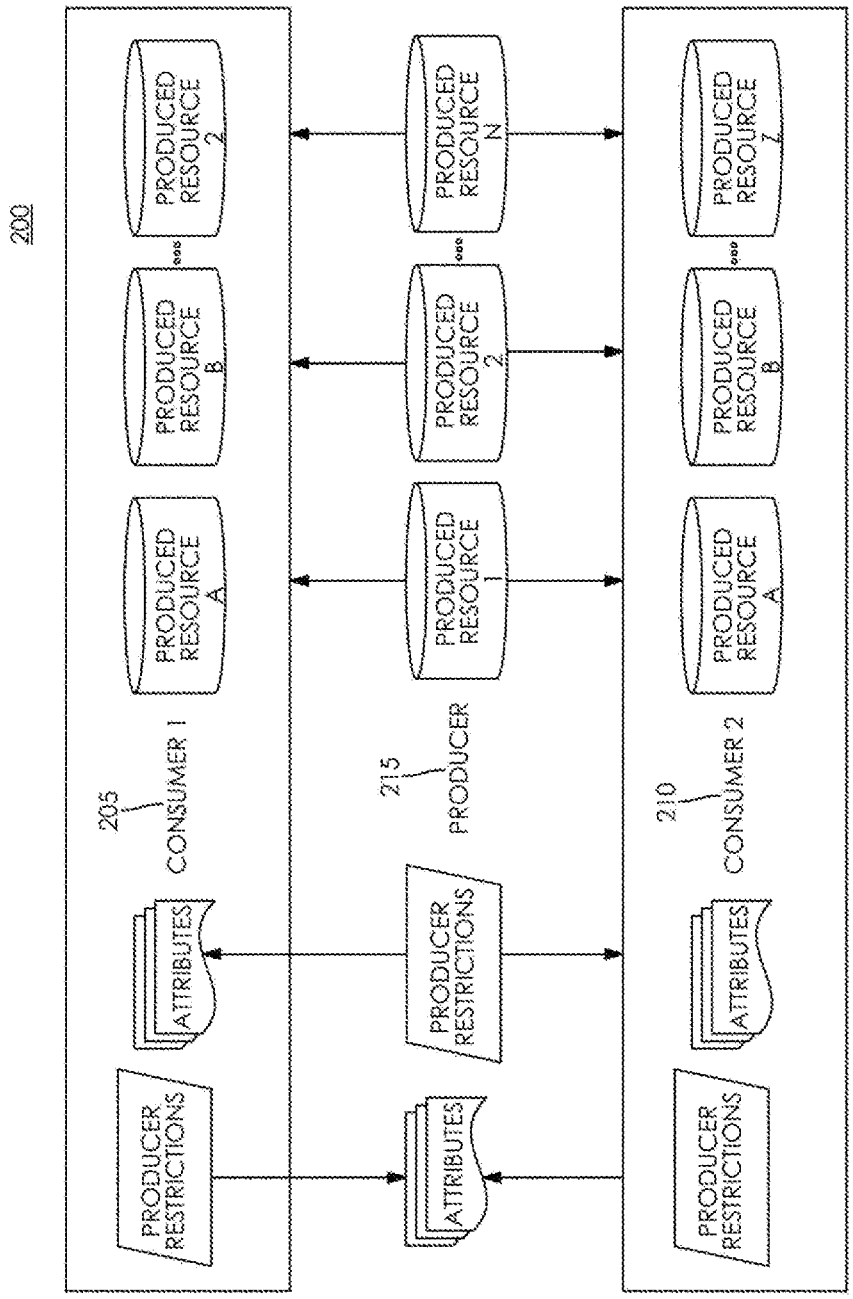
FIG. 2 illustrates an exemplary model of the parent-child (producer-consumer) relationship for resource consumption and restriction checking.

FIG. 2 illustrates an exemplary model of the parent-child (producer-consumer) relationship for resource consumption and restriction checking. In FIG. 2, an example of the parent-child (producer-consumer) relationship for resource consumption and restriction checking is shown, in accordance with an embodiment of the present invention. In the depicted example, the consumer 205 and the consumer 210 consume more than one resource produced by the producer 215. Note that, in this example, a consumer can consume resources from multiple producers even though the figure does not explicitly depict this scenario (for example, cpu cores from one producer but data storage from another).

Resources

Resources represent quantitative amounts that are produced and consumed. A relationship between a producer and a consumer is defined by the consumer consuming an amount of a particular resource from the producer. The producer keeps track of the resources that it produces.

A resource may contain, for instance:
name
total base amount
current amount
amount reserved for headroom: resources not useable by consumers either because they are needed for other maintenance purposes, or for future wiggle room
oversubscription amount: for resources that are not consumed at their maximum amount (such as cpu cores, network bandwidth, airline seats, telephone lines), this is a multiplier of how much extra over the total base amount the system will allow to be consumed.

Patterns

Using this model for an instantiation of supply, a pattern is needed that is a template to make supply on the fly. For example, a cabinet has a specific number of compute nodes (which have cpu cores and memory amounts) and storage. These patterns will enable creation of a new supply in a scenario for a capacity manager.

Using the Rules Engine to Derive Supply Patterns

Valid supply patterns can be expressed using dimensions, values, and rules for use in the rules engine. For example, the valid cpu and memory configurations for an oracle database could be expressed as:
if database_type=oracle then:

| template | cpu cores | mem | storage | storage |
|---|---|---|---|---|
| small | 2 | 16 | >1 | <100 |
| medium | 4 | 16, 32 | >5 | <500 |
| large | 8 | 64 | >100 | <10000 |

This would constrain the space of resources used by a database supply pattern.

Modeling Demand

In preferred embodiments, demand can be mapped to an object in the supply model. Typically, the demand is at the leaf consumers (i.e. databases, tenants, packages, etc.), but it could be at any level of the supply. For example, demand may include a new pluggable database (which is strictly a consumer), or it may include a new container database, which is both a producer and a consumer.

Demand need not start out as something that maps directly to the supply model. For example, a database may be running on old hardware so the cpu cores resource requirements need to be resized to fit the cpu cores of the target environment (i.e. newer computer cpu cores run faster than old computer cpu cores). This can be done in a number of ways:
1. In one embodiment, the ratio of the frequencies can be used to scale the cpu core requirements.
2. In a preferred embodiment, a benchmark that measures cpu core performance under conditions the software (i.e. a database) would run under, such as SPECint or SwingBench is used to scale the cpu core resources.

Once the minimum number of cores is known, this and the other resource and isolation constraints can be fed in as constraints to the rules engine to derive valid supply patterns map the demand. The output of the rules engine when enough of the dimensions are specified would be a supply pattern with all of the necessary resource consumption and attributes (if some of the dimensions have values that are non-unique, a default could be specified, the user could be asked to make a decision, or an error can be raised).

For example, suppose a database has the following characteristics:

| cpu SPECINT | cpu cores | mem | storage |
|---|---|---|---|
| 10 | 4 | 32 | 200 |

If the target environment had a cpu SPECINT of 40, then the system would need 1 core (because the new cpu is 4 times more powerful), 32 GB of memory, and 200 GB of storage. But the rules above would force the choice to be the medium pattern because of the memory and storage requirements.

Mapping Modeled Demand to Existing Supply

Given a consistent model of demand and supply, there is need to find a place to fit the demand in the supply model. The demand will consume resources, have placement isolation requirements, and have attributes that may preclude specific placements if the producer that it is going to be placed on has isolation requirements. For example, a database demand may have the following characteristics:
attributes
  object type: pluggable database (PDB)
  line of business: 'eCommerce'
  application id: 12345
  database type: oracle
  database version: 12c
  number of high availability nodes: 2 [must be in the same CDB, must be on different nodes]
  number of disaster recovery instances: 1 [i.e. no disaster recovery]
resource requirements:
  4 cpu cores (from a CDB instance)
  32 GB of memory (from a CDB instance)
  200 GB of storage (from a cabinet)
placement isolation requirements:
  line of business of all databases where this one will reside must be 'eCommerce'
  application id of all databases where this one will reside must be 12345
  data center must be 'Richmond 2'
  lifecycle environment must be 'production'

Utilizing the mapping, the system is tasked to find a set of producers of the right types that provide resources of the right types. Looking at the resources, the system is configured to find a CDB that has at least 2 nodes of resources available with 4 cpu cores and 32 GB of memory at least on each. Further, 200 GB of storage is needed in the cabinet that the compute nodes are in. The CDB instance should have an isolation requirement that only databases from 'eCommerce' line of business and application id 12345 are allowed in the producer. The producer needs to be in data center 'Richmond 2' and the cabinet needs to be a production cabinet. Further, the producer may have other restrictions (i.e. it must be able to house oracle 12c databases) that the PDB must meet. The system can identify such a producer, for instance, by making an SQL query for the above conditions.

If multiple producers are needed, it is desirable that they obey the same and different aspects of the attributes of the demand request. For example, if a CDB instance spanned 4 nodes, and the PDB requires 2 nodes, then the choices are nodes (1,2), (1,3), (1,4), (2,3), (2,4), (3,4). Any combination that does not have enough resources would be eliminated. In a similar manner, a PDB with disaster recovery requirements would need to CDBs configured in a disaster recovery mode (i.e. same name, both support disaster recovery) in different data centers.

The result of this process is the system generating a set of supply objects that meet the demand criteria and the demand meets their isolation criteria.

Other examples supply/demand mapping that can be done by this invention include (but are not limited to):
  A passenger trying to get from Atlanta to Denver leaving Friday afternoon and returning Monday morning. Identifying the planes that work.
  A package with dimensions 10" length by 5" width by 8" depth going from a warehouse in Miami to a house in Houston. Identifying the trucks that work.

Often times, there are multiple supply objects that the system could map to the demand. For example, a database demand could be modeled by one or more supply databases of different versions (i.e. Oracle 11g vs Oracle 12c). Similarly, a demand to ship a parcel could be met by a truck, a plane, or a ship. In one embodiment, the user can provide hints as to which type of supply object they would prefer through a targeted supply environment model.

Selecting the Best Placement

Given a set of multiple places for a demand to be placed to consume resources, the system is configured to find and utilize the best one given a policy. Typical policies include, densify (pack the supply as much as possible), load balance (keep the used resources across placements as equal as possible), maximize largest or smallest free resources, minimize largest or smallest free resources.

To run any of these policies, the system will attempt to place the demand in each supply object and look at the remaining utilization of resources (either absolute number, or percentage utilization). If the system wanted to balance resources, it would choose the placement that minimizes the standard deviation of the resource utilization of each producer. If the system wanted to densify, the system would choose the placement that would minimize the absolute amount of free resources.

Reserving Placement Capacity

According to an embodiment of the present invention, by default, placement only reserves capacity for future provisioning. Tags can be added by the system to manage reservation states. Some examples of states include but are not limited to committed, used, decommissioned and possibly other states based on the business needs.

Proposing Supply When No Existing Supply is Present

If there is no place for a demand to fit, the system can rationalize what objects are needed to make resources to place the demand. In the PDB example above, if there were no CDB instances meeting the demand criteria, the system could make a CDB instance from the supply pattern template. The system knows that it needs a CDB that supplies at least 4 cpu cores, 32 GB of memory. In addition, it needs to live on a cabinet that has 200 GB of free storage.

Suppose there exists a CDB that meets the demand placement requirements and the supply isolation requirements, but doesn't have enough cpu cores or memory resources. If the compute nodes (i.e. the producer for the CDB's cpu and memory resources) has space, the CDB can be resized so it the PDB fits.

Suppose there is a cabinet that meets of the demand requirements. If there is space on the cabinet compute nodes, the system can be configured to propose a CDB with the correct dimensions (chosen the using the same method as described in the 'Modeling Demand' section). Then, the system could then place the PDB.

Suppose there is no cabinet that meets of the demand requirements. Then, the system can derive the cabinet dimensions from the needs of the PDB and CDB (e.g., chosen using the same method as described in the 'Modeling Demand' section). If there is no data center floor space for a cabinet, the system could generate a proposal for a new data center, or raise an error.

This supply resizing and modeling is not unique to database provisioning; it can be used in any field where demand consumes resources that model-able supply produces. In a similar manner the system can propose a scenario of supply from other types of demand. For example, if there are more passengers from Atlanta to Denver on a specific date, the system could propose adding a plane to the route. If there are no free planes, the system could raise an error. Another example is a package that needs to be delivered and there are no trucks available; the system could generate a proposal to place another truck on the route if there were available trucks and drivers, or, alternatively, where no trucks and/or drivers were available, generate a proposal with respect to the needs for additional equipment or personnel.

Often times, there are multiple supply objects that could be mapped to the demand. For example, a database demand could be modeled by a supply of databases of different versions (i.e. Oracle 11g vs Oracle 12c). Similarly, a demand to ship a parcel could be met by a truck, a plane, or a ship. In one embodiment, the user can provide hints as to which type of supply objects they would prefer through a targeted supply environment model.

Creating Scenarios With Bulk Demand

Often times, it is required to make many supply demand mappings with a large group of demands. For example, a CIO may wish to make decisions on what hardware to purchase for a migration of applications off of old hardware, or based on forecasts of net new applications. The system and methods described herein can be used iteratively to find existing or new supply for many demands, based potentially in part on previous purchases and predictive analytic means for identifying appropriate new hardware selections.

However, the order which demands are placed in a scenario can change the outcome drastically. For example, if many small databases were placed on an empty cabinet, the placement policy may densely pack them on node 1. Then a large 8-node database may be requested and there is no space on the cabinet for it. However, if the large database was placed first, everything would fit fine.

In one embodiment, the user could prioritize the list of demands in the order of their choosing so they could control the order of the placement by the system. For example:

| priority | demand name |
| --- | --- |
| 1 | Demand 3 |
| 2 | Demand 1 |
| 3 | Demand 5 |
| 4 | Demand 4 |
| 5 | Demand 2 |

In another preferred embodiment, the user may group sets of demand into priority groups like this:

| priority | demand name |
| --- | --- |
| 1 | Demand 3 |
| 1 | Demand 1 |
| 1 | Demand 5 |
| 2 | Demand 4 |
| 2 | Demand 2 |

In this case, a scenario builder can choose to order demand 3, demand 1, and demand 5 in any order. One reason the system may be configured to allow a user to create priority groups is that business needs may require some demand to be met in a first wave and other demand to be met in additional waves. If there is no such requirement, all demand could be prioritized as '1' to allow the scenario builder the most flexibility.

To minimize the number of supply objects required, the scenario builder can group and order the demand in a priority group. First, the scenario builder will group the demand of the same type with the same attributes. A single supply object with the aggregate resources needed can be requested (instead of many supply objects being requested, possibly on different hardware). Additionally, this aggregation can speed up the scenario building process because only one placement is needed instead of many small placements.

To minimize wasted resources, the scenario builder can place the largest demands (or supply derived from aggregate demand) in a priority group. Then the smaller demands will fit in the remaining spaces. Because there may be multiple resources requested, sometimes there is no ordering of 'largest' to 'smallest'. For example, one database demand may require 4 cpu cores and 100 GB of storage and another database demand may require 1 cpu core and 500 GB of storage. In these cases, the scenario builder can look for the resource that is most constrained (i.e. has the highest aggregate percent utilization of supply pattern resources) and order by demand utilization of that resource. This determination of the bottleneck resource can be made at the entire demand list level, or per any attribute that isolates the demand into different supply objects that can be purchased. For example, cabinets are often split into development, user acceptance testing, and production. The development demand may be CPU intensive (e.g. takes 90% CPU, 50% memory, 20% storage) whereas production may be storage intensive (e.g. takes 90% storage, 50% memory, 20% CPU). The scenario build can order the demands accordingly in each environment.

According to an embodiment of the present invention, a system for providing scalable and robust capacity modeling may be comprised of the following components:

| Component | Description |
|---|---|
| UI | A UI enables intuitive self-service interface with other system components. |
| CLI | A CLI enables a robust self-service command line interface and enables bulk operations on system actions. CLI is a component configured to enable manage-many-as-one strategy. |
| Service Consumer API Gateway | The system engine may be architected to be accessible by a self-discoverable REST API. The system engine holds a collection of objects (e.g., user created systems, targets, quotas, resources) whose properties and methods can be queried through communications protocols and commands (e.g., HTTP commands (GET, POST, PUT, DELETE)). These communications may cause the system to take certain actions (e.g., select, create, update or delete more objects). An API may be documented, for instance, using the Swagger API specification, such that a developer portal is provided which allows users to quickly interact with the API without having to code a client. |
| Service Catalog | A Service catalog may contain an intuitive, yet programmatic definition of catalog items. For instance, in one embodiment, the service catalog may have three dimensions that are integrated together and deliver a flexible definition of a DBaaS Service storefront on a market, an example of which is shown below: 1. A Business Catalog provides consumers with a succinct description of the salient features and costs of available services. Business Catalog enables users to model their workloads using SLA. Selected service are exposed in a self-service UI, allowing consumers to independently provision those services on demand. 2. A Technical Catalog is a provider's detailed guide to deploying and managing services and defines certified combination of underlying technology options. 3. Criteria for identifying valid DBaaS patterns through transformation rules in the catalog and exceptions handling are specified in a Triage Assessment in a planning phase. |
| Intelligent Service Catalog Engine | A catalog logic engine of the system may be configured to accept one or more of a business and technical catalog of dimensions, their valid values, and constraint rules that connect the values. For example, a business dimension may consist of a database pattern which then defines amounts of CPU, Memory, Storage Min/Max, connections, or other amount types or any combination thereof. |
| Hardware Infrastructure Platform | A physical infrastructure servicer fabric is exposed to the DBaaS Platform of the system through an adaptor layer that defines secure management hooks into a physical tier. |
| Intelligent Placer Engine | An Intelligent Placer Engine component of the system leverages advanced algorithms configured based on customer requirements (e.g. balance vs. density) to find valid targets of a provisioning request given one or more of a user/group identity (who), a bill of materials from the catalog (what), a forecasted need date (when), a landscape of targets with available resources (where), and a set of quotas that govern those resources (authorization). |
| User Actions Library | A user action library of the system defines vendor specific scripts to perform technology specific operations. For instance, "<product name>" may have a mature library of actions or can integrate with engineering scripts in use by a customer today. The later approach allows for a smoother transition to a cloud management model. |
| Provisioning Engine | A Provisioning Engine of the system is a framework that combines orchestration with configuration management and wraps engineering scripts with one or more of input/output parameter validation, status and error reporting and workflow capabilities. A module in the Provisioning Engine comprises one or more of clear input parameters, a series of actions with a dependence structure (e.g., actions B, C cannot start until action A is complete, action D cannot start until action C is completed), and a mechanism to provide status back. |
| Scheduler | A Scheduler Module of the system is responsible to queue and release actions later. The Scheduler is heavily used in environments that integrate with ITSM workflows that might be required before an action is permitted to change a target state of the environment. An example would be a request to approve environment for downtime to perform patching. |
| Service Provider API Gateway | A Service Provider API Gateway of the system secures lower level API and CLI provided by infrastructure and database software vendors. |
| CMDB Server | A Configuration Management Database of the system is a repository that is able to store and service the latest configuration view across DBaaS landscape. |
| CMDB Agent | A CMDB agent of the system is a lightweight and secure engine that can execute discovery or change the state actions. |
| Analytics Module | An Analytics Module of the system enables ETL and aggregation of CMDB information to provide service level analytical capabilities to DBaaS users. |
| Monitoring Module | A Monitoring Module of the system enables continuous monitoring of KPI levels against their thresholds and delivers timely notifications to DBaaS customers and support teams. |

One of ordinary skill in the art would appreciate that the above listing of components is merely for exemplary purposes. For instance, a graphical representation of a different embodiment of the system components is shown in FIG. 3.

Figure 3:
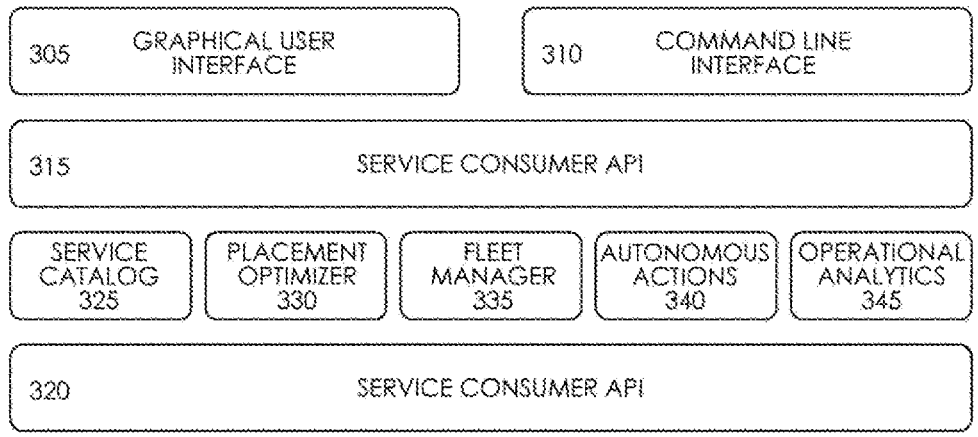
FIG. 3 illustrates an exemplary system architecture for modeling capacity in accordance with an embodiment of the present invention.

FIG. 3 illustrates an exemplary system architecture for modeling capacity in accordance with an embodiment of the present invention. In the depicted embodiment, the exemplary capacity modeling system architecture 300 includes the graphical user interface (GUI) 305 and the command line interface 310 configured to provide consumer access and control to various resources through the service consumer application programming interface (API) 315 and the service consumer API 320. In the illustrated embodiment, the exemplary capacity modeling system architecture 300 includes the service catalog 325, the placement optimizer 330, the fleet manager 335, autonomous actions 340, and operational analytics 345, accessible via the service consumer API 315 and the service consumer API 320. Systems for use in conjunction with the methods described herein could use additional or fewer components, or have certain components combined into a different hierarchy or set of modules. Each of the potential variations is contemplated for use with embodiments of the present invention.

Figure 4:
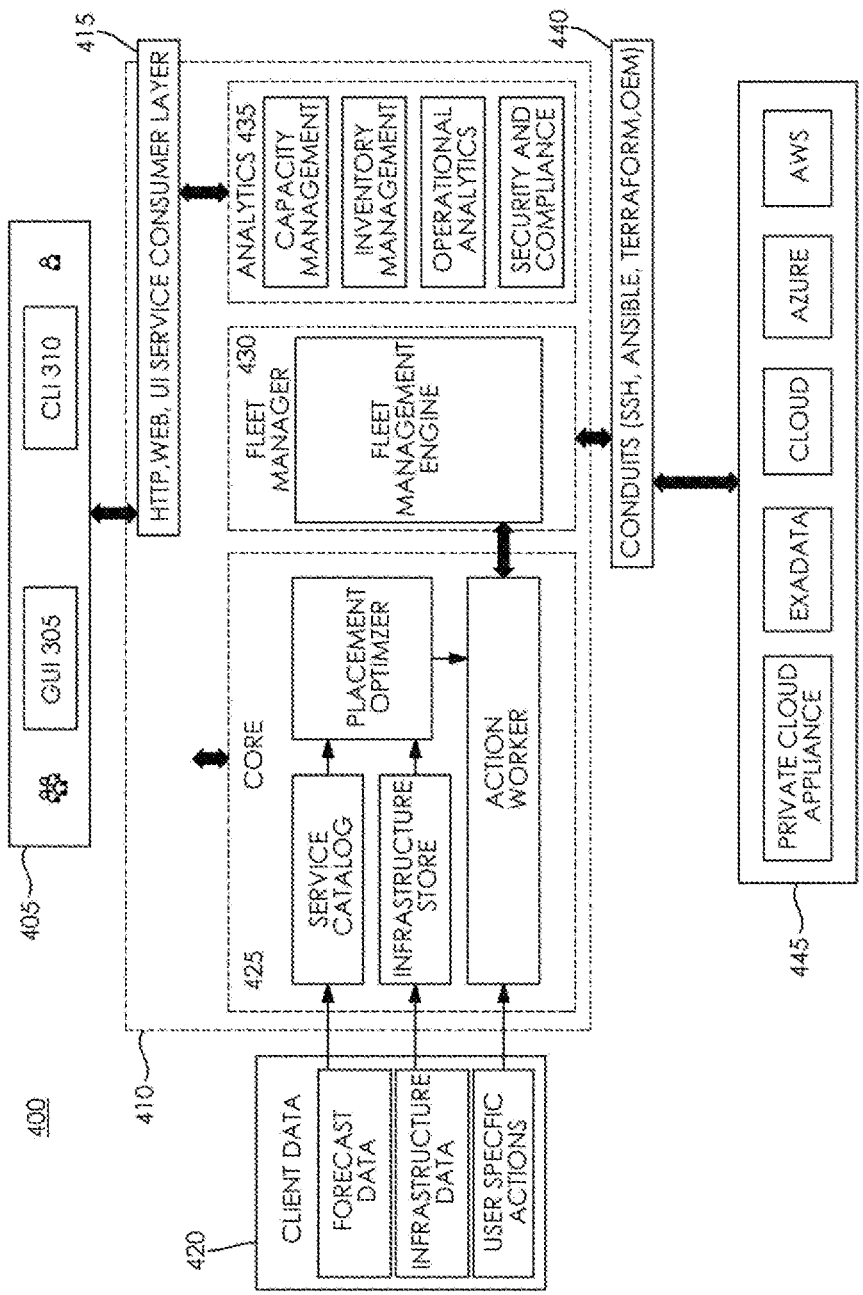
FIG. 4 illustrates a more detailed view of a system architecture including components designed to perform the methods disclosed herein.

FIG. 4 illustrates a more detailed view of a system architecture including components designed to perform the methods disclosed herein. In the illustrated embodiment, the exemplary capacity modeling system architecture 400 includes the graphical user interface (GUI) 305 and the command line interface 310 configured to provide user access and control to capacity infrastructure modeling and management system 410 via the depicted service consumer layer interface 415. In the depicted embodiment, the capacity modeling system architecture 400 receives client data 420 including forecast data, infrastructure data, and user specific actions via the capacity infrastructure modeling and management system core 425. In the illustrated example, the depicted fleet manager 430 includes the fleet management engine coupled with the action worker configured in the modeling and management system core 425. In the depicted embodiment, the capacity infrastructure modeling and management system 410 includes the analytics module 435. In the illustrated embodiment, the capacity infrastructure modeling and management system analytics module 435 includes capacity management, inventory management, operational analytics, and security and compliance modules. In the depicted embodiment, the illustrated conduits 440, including, for example, any of ssh, ansible, and terraform, operably couple the capacity infrastructure modeling and management system 410 with exemplary cloud resources 445 including, for example, a private cloud appliance, Exadata, Azure, or AWS elements.

Figure 5:
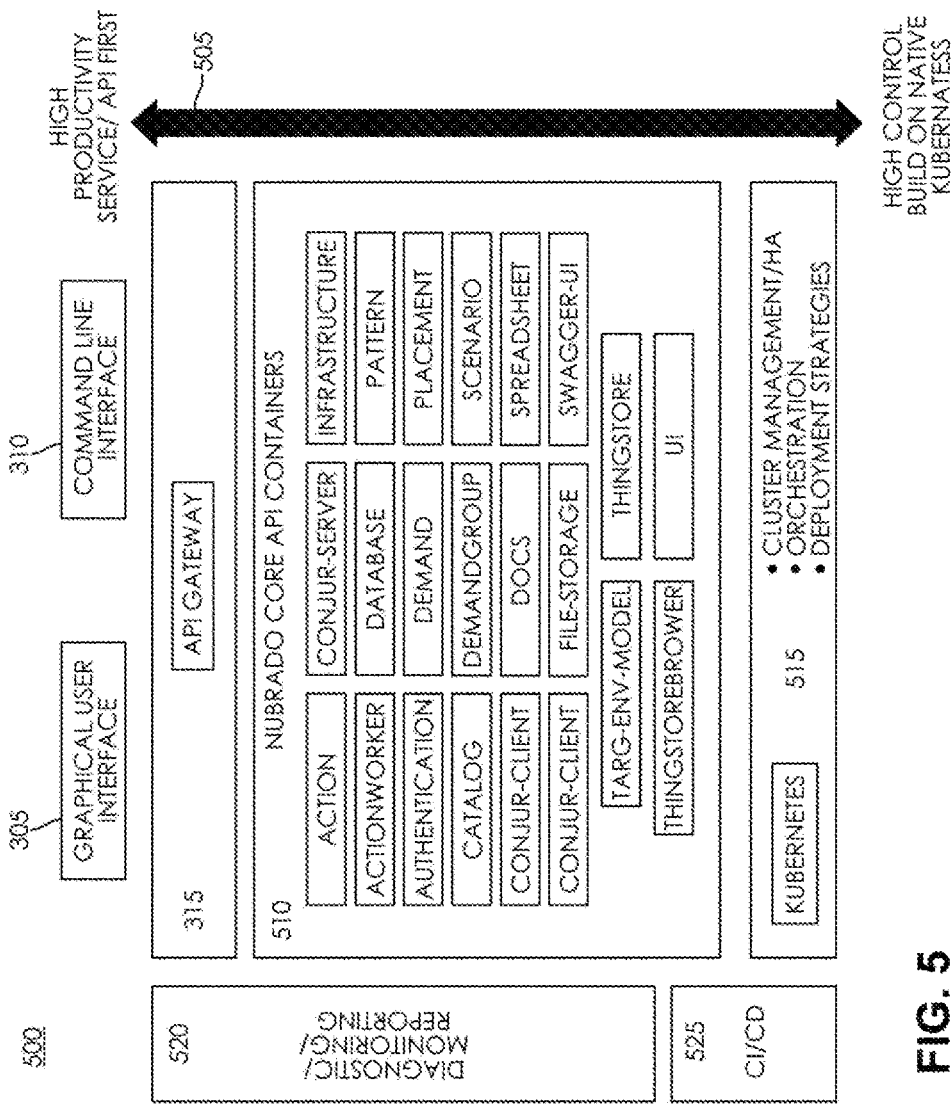
FIG. 5 illustrates an embodiment of the micro-service containers that could implement the components of the system.

FIG. 5 illustrates an embodiment of the micro-service containers that could implement the components of the system. In the depicted embodiment, the exemplary capacity modeling system architecture 500 includes the service and control interface 505 adapted to provide access and control to the core API containers 510 in addition to container cluster management, orchestration, and deployment via the control interface 515. In the illustrated example, the graphical user interface (GUI) 305 and the command line interface 310 enable user access and control via the service consumer API 315. In the depicted example, the exemplary capacity modeling system architecture 500 includes the diagnostic monitoring and reporting module 520 and the container instance/container data module 525.

Figure 6:
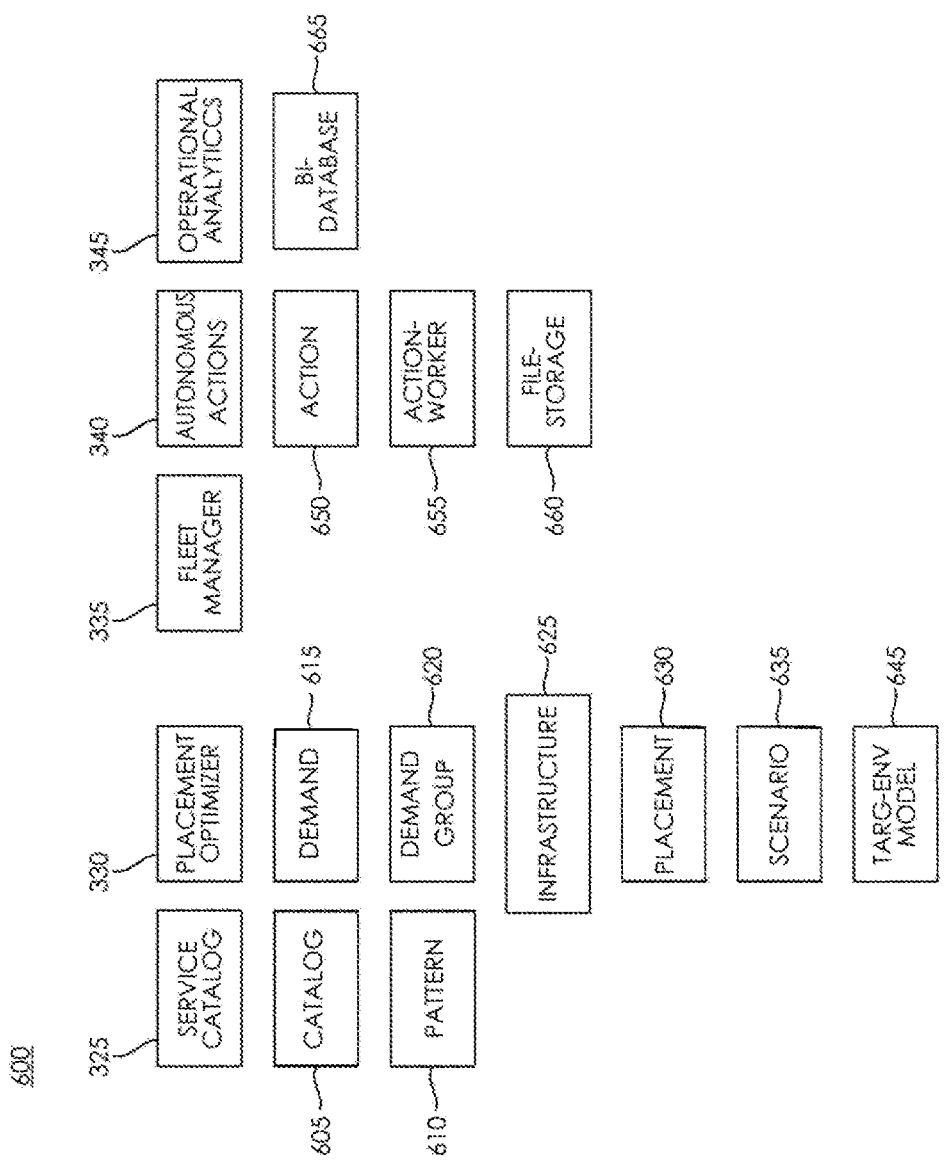
FIG. 6 illustrates an exemplary mapping of the containers depicted by FIG. 5 to the high level components depicted by FIG. 3.

FIG. 6 illustrates an exemplary mapping of the containers depicted by FIG. 5 to the high level components depicted by FIG. 3. In the depicted example, the exemplary container mapping 600 includes the service catalog 325, the placement optimizer 330, the fleet manager 335, autonomous actions 340, and operational analytics 345.

In the illustrated example, the service catalog 325 maps to the catalog 605 and pattern 610. In the depicted embodiment, catalog 605 defines dimensions and options for them. The dimensions and options provide a mechanism to enforce standards at scale and validate catalog requests. In the illustrated embodiment, pattern 610 defines the structure and rules through which infrastructure can be created, and the relationships between them.

In the depicted example, the placement optimizer 330 maps to demand 615, demandgroup 620, infrastructure 625, placement 630, scenario 635, and target environment model 645. In the illustrated example, demand 615 accepts inventory demand as input and validates the demand against the demand catalog using the catalog service. In the depicted example, demandgroup 620 groups a list of demands in order to create a scenario, taking a demand group id, and a subset of prioritized demand in that demand group, to create a scenario. In the illustrated example, infrastructure 625 represents entities that Nubrado manages. Infrastructure 625 is constrained by patterns and can be composed of other infrastructure, for example, wherein greater infrastructure may contain one or more lesser infrastructure. In the depicted example, placement 630 provides requirements for attributes that must be present, allows restrictions, and strategies to propose and place endpoints. In the illustrated example, scenario 635 converts demand to infrastructure and provides an overview of the placements of infrastructure and the resource consumption of the scenario. In the depicted example, target environment model 645 provides attributes and policies to guide the conversion from demand to infrastructure.

In the illustrated example, autonomous actions 340 maps to action 650, actionworker 655, and file-storage 660. In the depicted example, action 650 allows interaction with job entities and defines an operation which can be performed, the details of how the operation may be performed, what data is needed to perform the operation, and which target entity types the operation may be valid for. In the illustrated example, actionworker 655 includes a background process responsible for executing jobs, for example, via POSTs to the action API. In the depicted example, file-storage 660 stores and retrieves files from actions and job-logs.

In the depicted example, operational analytics 345 maps to bi-database 665. In the illustrated example, business intelligence database 665 includes a normalized ETL schema containing a rollup of activity within the platform.

Figure 7A:
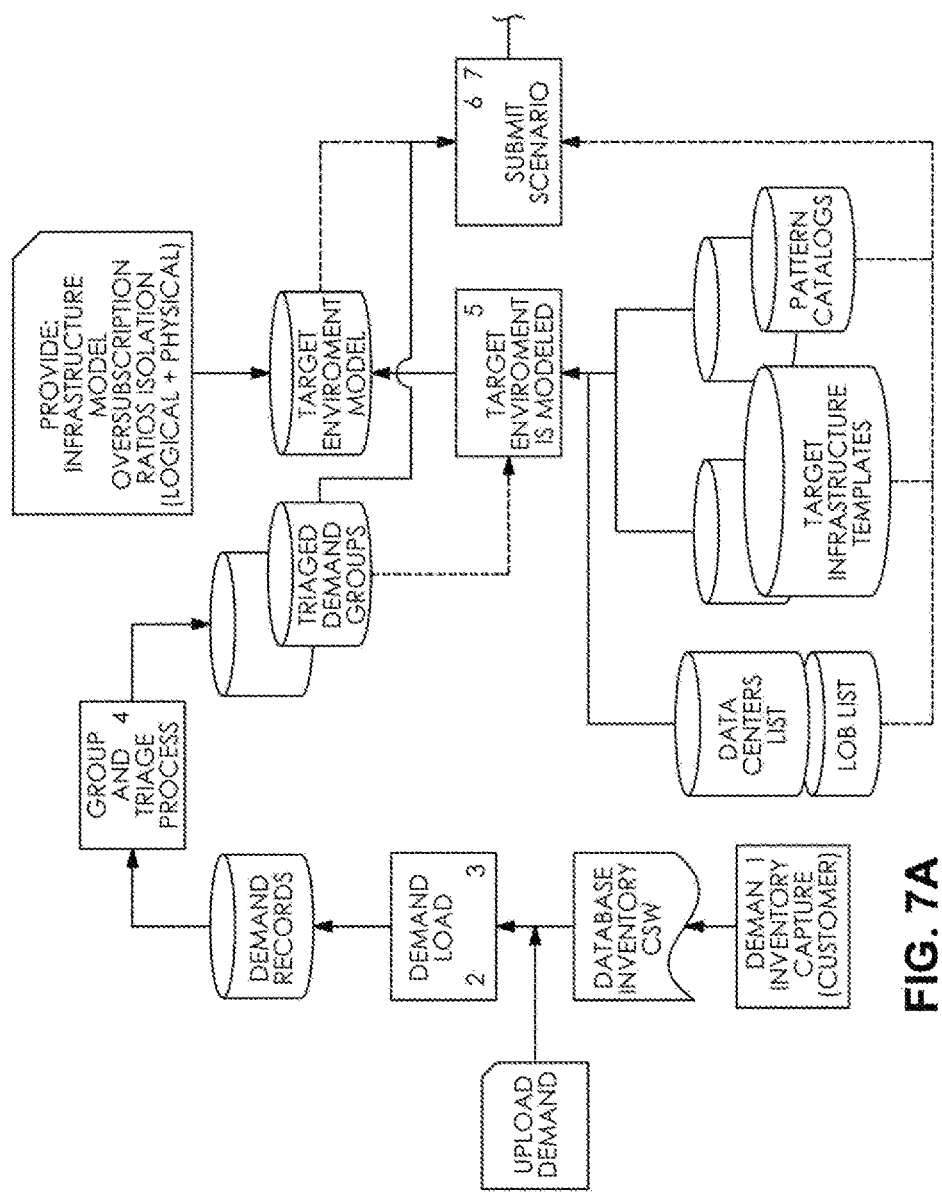
FIGS. 7A-7B together illustrate an exemplary workflow depicting how a business could use an embodiment system to determine a scenario proposal, build a placement report, and plan the build out of the hardware and software.
Figure 7B:
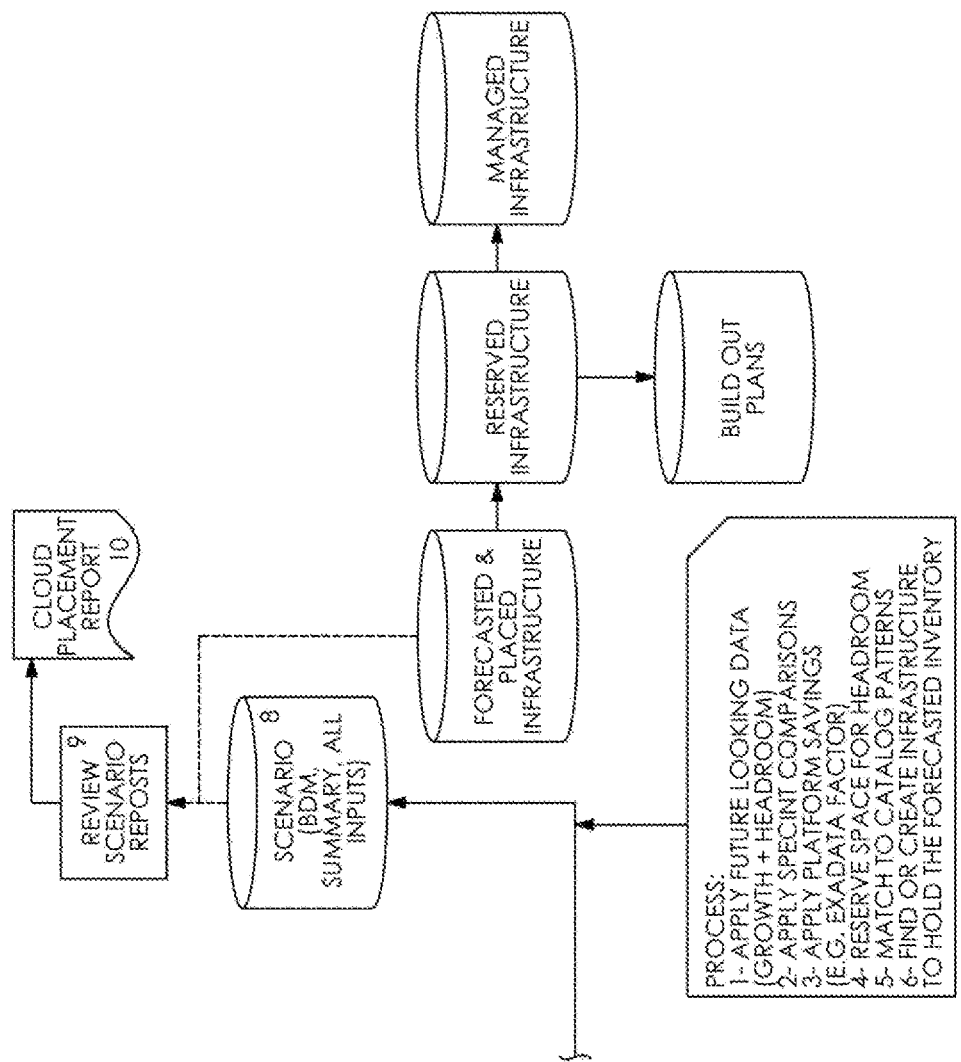

FIGS. 7A-7B together illustrate an exemplary workflow depicting how a business could use an embodiment system to determine a scenario proposal, build a placement report, and plan the build out of the hardware and software. In an illustrative example, the numbers in the figure correspond to the steps below:

| # | Participant | Step | Description |
|---|---|---|---|
| 1 | Customer | Database Inventory Capture | Customer or their agents identify demand for DBaaS gathering a listing of database inventory for migration. (Note, this may be done outside of the system) |
| 2 | Customer | Data Inventory (into Demand Records) Load | Customer has a UI that provides instructions and an example with a standard .csv file the customer can use to upload theirdatabase inventory into the system for processing. Once loaded into the system the database inventory records will be known as demand records. |
| 3 | System | Demand record validation and storage. | The system validates the customer data against the standard upload template and identifies records within the demand inventory that could not be loaded. The customer can delete the entire load and correct the records and reload, or accept the data successfully loaded and proceed, or re-upload the corrected entries that failed validation. A customer demand inventory summary will be displayed on the UI and saved by the system. |
| 4 | Customer | Demand Group and Triage | A Demand Group UI displays the customer's demand inventory where the user can group the list into one or more demand groups. These demand groups are then assigned to specific roles or users in the tool. |
| 5a | Customer | Model target environment | A UI with Cloud subscription details (optional) or On-premise target infrastructure preferences are captured (for example, exadata x6 on-prem, exadata x6 cloud at customer, exadata x6 oracle cloud, exadata x7 on-prem, exadata x7 cloud at customer). Either subscription or target infrastructure must be provided to model the target environment. |

-continued

| # | Participant | Step | Description |
|---|---|---|---|
| 5b | Customer | Define target environment assumptions | A UI (could be same screen as model target environment) with explanation of CPU Oversubscription ratios and logical/physical placement policies specified on the demand inventory records. The customer can choose oversubscription per database lifecycle or none. The customer can identify the column(s) that they would like to be considered for isolation. Columns of the demand inventory should be highlighted if they can be used for isolation. The customer can name and save the target environment assumption collected. |
| 6 | Customer | Submit Scenario | A UI shows a formatted summary of the customer demand group with sortable and filterable columns. When sorted the list is automatically prioritized within the group, the customer can update priority. Additionally, the customer can choose to exclude any Demand Inventory from this Scenario. The customer provides target environment, and assumptions. A Submit Scenario button posts the input to the system for processing. |
| 7 | System | Scenario Processing | Process:<br>1 - apply future looking data (growth)<br>2 - apply specint comparisons<br>3 - apply platform savings<br>(e.g. Exadata performance factor)<br>4 - reserve space for headroom<br>5 - match to catalog patterns<br>6 - find or create infrastructure to hold the forecasted inventory |
| 8 | System | Placement Scenario Created | The system stores the BOM for infrastructure, calculated Summary totals, and all of the inputs used to create the scenario. This also includes Forecasted and Placed Inventory for all items in the input Demand, as well as any generated items such as CDB containers. |
| 9 | Customer | View Scenario | A UI renders graphs for the customer based on Scenario results. Calculations should not be performed in the UI to ensure accuracy. If the customer wants to run multiple scenarios with the same ordered and prioritized demand group, there will be a button that can be pressed to go back to the submit scenario screen that will bring forward the same demand group with the same order and prioritization that was previously used. |
| 10 | Customer | Download Cloud Placement Report | Customer can download the data artifacts to build the cloud report. This can be a button on the View Scenario screen. |

In an illustrative example, an embodiment process in accordance with the exemplary workflow depicted by FIG. 7 may perform the steps disclosed in this section. In some embodiments, a processor or central processing unit (CPU) may execute program instructions causing the processor to perform the steps disclosed herein. In various embodiments, the steps may be performed in any order, except such an order which one skilled in the relevant art may recognize as nonsensical. In the depicted embodiment, an exemplary workflow in accordance with the process depicted by FIG. 7 may begin at step 1 by applying future looking data, for example, growth+headroom. Then, the method continues at step 2 applying specint comparisons. Then, the method continues at step 3 applying platform savings, for example, an exadata factor. Then, the method continues at step 4, reserving space for headroom. Then, the method continues at step 5 matching to catalog patterns. Then the method continues at step 6, finding or creating infrastructure to hold forecasted inventory. In various examples, the method may repeat.

Figure 8:
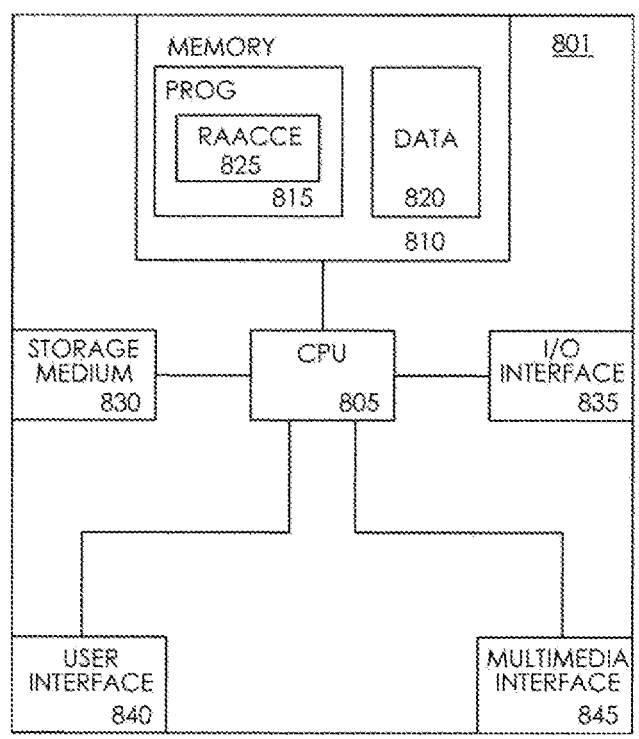
FIG. 8 illustrates a block diagram of an exemplary resource and attribute tasking system configured to construct a resource and attribute tasking solution to complete a user's objective with resource and attribute characteristics defining the tasked resources and attributes in response to receiving a task definition, and satisfying a task definition constraint.

FIG. 8 illustrates a block diagram of an exemplary resource and attribute tasking system configured to construct a resource and attribute tasking solution to complete a user's objective with resource and attribute characteristics defining the tasked resources and attributes, in response to receiving a task definition, and satisfying a task definition constraint. In FIG. 8, the block diagram of the exemplary resource and attribute tasking system 801 includes processor 805 and memory 810. The processor 805 is in electrical communication with the memory 810. The depicted memory 810 includes program memory 815 and data memory 820. The depicted program memory 815 includes processor-executable program instructions implementing the RAACCE (Resource and Attribute Assignment and Capacity Configuration Engine) 825. In some embodiments, the illustrated program memory 815 may include processor-executable program instructions configured to implement an OS (Operating System). In various embodiments, the OS may include processor executable program instructions configured to implement various operations when executed by the processor 805. In some embodiments, the OS may be omitted. In some embodiments, the illustrated program memory 815 may include processor-executable program instructions configured to implement various Application Software. In various embodiments, the Application Software may include processor executable program instructions configured to implement various operations when executed by the processor 805. In some embodiments, the Application Software may be omitted. In the depicted embodiment, the processor 805 is communicatively and operably coupled with the storage medium 830. In the depicted embodiment, the processor 805 is communicatively and operably coupled with the I/O (Input/Output) interface 835. In the depicted embodiment, the I/O interface 835 includes a network interface. In various implementations, the network interface may be a wireless network interface. In some designs, the network interface may be a Wi-Fi interface. In some embodiments, the network interface may be a Bluetooth interface. In an illustrative example, the resource and attribute tasking system 801 may include more than one network interface. In some designs, the network interface may be a wireline interface. In some designs, the network interface may be omitted. In the depicted embodiment, the processor 805 is communicatively and operably coupled with the user interface 840. In various implementations, the user interface 840 may be adapted to receive input from a user or send output to a user. In some embodiments, the user interface 840 may be adapted to an input-only or output-only user interface mode. In various implementations, the user interface 840 may include an imaging display. In some embodiments, the user interface 840 may include an audio interface. In some designs, the audio interface may include an audio input. In various designs, the audio interface may include an audio output. In some implementations, the user interface 840 may be touch-sensitive. In some designs, the resource and attribute tasking system 801 may include an accelerometer operably coupled with the processor 805. In various embodiments, the resource and attribute tasking system 801 may include a GPS module operably coupled with the processor 805. In an illustrative example, the resource and attribute tasking system 801 may include a magnetometer operably coupled with the processor 805. In some embodiments, the user interface 840 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 805 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 810 may contain processor executable program instruction modules configurable by the processor 805 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 805 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 810 may contain processor executable program instruction modules configurable by the processor 805 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 805 is communicatively and operably coupled with the multimedia interface 845. In the illustrated embodiment, the multimedia interface 845 includes interfaces adapted to input and output of audio, video, and image data. In some embodiments, the multimedia interface 845 may include one or more still image camera or video camera. In various designs, the multimedia interface 845 may include one or more microphone. In some implementations, the multimedia interface 845 may include a wireless communication means configured to operably and communicatively couple the multimedia interface 845 with a multimedia data source or sink external to the resource and attribute tasking system 801. In various designs, the multimedia interface 845 may include interfaces adapted to send, receive, or process encoded audio or video. In various embodiments, the multimedia interface 845 may include one or more video, image, or audio encoder. In various designs, the multimedia interface 845 may include one or more video, image, or audio decoder. In various implementations, the multimedia interface 845 may include interfaces adapted to send, receive, or process one or more multimedia stream. In various implementations, the multimedia interface 845 may include a GPU. In some embodiments, the multimedia interface 845 may be omitted. Useful examples of the illustrated resource and attribute tasking system 801 include, but are not limited to, personal computers, servers, tablet PCs, smartphones, or other computing devices. In some embodiments, multiple resource and attribute tasking system 801 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the following FIG. 9 description. In some embodiments, an exemplary resource and attribute tasking system 801 design may be realized in a distributed implementation. In an illustrative example, some resource and attribute tasking system 801 designs may be partitioned between a client device, such as, for example, a phone, and, a more powerful server system, as depicted, for example, in FIG. 9. In various designs, a resource and attribute tasking system 801 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary resource and attribute tasking system 801 may be configured to operate on a device with less processing power, such as, for example, various gaming consoles, which may not have sufficient processor power, or a suitable CPU architecture, to adequately support resource and attribute tasking system 801. Various embodiment designs configured to operate on a such a device with reduced processor power may work in conjunction with a more powerful server system.

In an illustrative example, FIG. 1 depicts an exemplary process flow of an embodiment RAACCE (Resource and Attribute Assignment and Capacity Configuration Engine) 825. The method depicted in FIG. 1 is given from the perspective of the RAACCE 825 implemented via processor-executable program instructions executing on the resource and attribute tasking system 801 processor 805, depicted in FIG. 8. In the illustrated embodiment, the RAACCE 825 executes as program instructions on the processor 805 configured in the RAACCE 825 resource and attribute tasking system 801 host, depicted in at least FIG. 8 and FIG. 9. In some embodiments, the RAACCE 825 may execute as a cloud service communicatively and operably coupled with system services, hardware resources, or software elements local to and/or external to the RAACCE 825 resource and attribute tasking system 801 host.

The exemplary method 100 depicted by FIG. 1 begins at step 102 with the processor 805 starting search solution for a dimension. The method continues at step 104 with the processor 805 performing a test to determine if there are more valid values. Upon a determination by the processor 805 at step 104 there are not more valid values, the method continues at step 106 with the processor 805 ending search for this dimension. Upon a determination by the processor 805 at step 104 there are more valid values, the method continues at step 108 with the processor 805 getting the next valid value. The method continues at step 110 with the processor 805 unsetting all values for this dimension in the global state vector. The method continues at step 112 with the processor 805 setting only this value as valid in this dimension in the global state vector. The method continues at step 114 with the processor 805 checking rules with the global state vector, and the method continues at step 116 with the processor 805 performing a test to determine if there is only one valid value per dimension. Upon a determination by the processor 805 there is only one valid value per dimension, the method continues at step 120 with the processor 805 adding this solution to the list of valid solutions, and the method continues at step 104 with the processor 805 performing a test to determine if there are more valid values. Upon a determination by the processor 805 there is not only one valid value per dimension, the method continues at step 118 with the processor 805 checking rules with the global state vector, and the method continues at step 122 with the processor 805 starting search solution for a dimension. The method continues at step 124 with the processor 805 performing a test to determine if there are more valid values. Upon a determination by the processor 805 there are not more valid values, the method continues at step 126 with the processor 805 ending search for this dimension, and the method continues at step 104 with the processor 805 performing a test to determine if there are more valid values. Upon a determination by the processor 805 there are more valid values, the method continues at step 128 with the processor 805 getting the next valid value. The method continues at step 130 with the processor 805 unsetting all values for this dimension in the global state vector. The method continues at step 132 with the processor 805 setting only this value as valid in this dimension in the global state vector. The method continues at step 134 with the processor 805 checking rules with the global state vector, and the method continues at step 136 with the processor 805 performing a test to determine if there is only one valid value per dimension. Upon a determination by the processor 805 there is only one valid value per dimension, the method continues at step 140 with the processor 805 adding this solution to the list of valid solutions, and the method continues at step 124 with the processor 805 performing a test to determine if there are more valid values. Upon a determination by the processor 805 there is not only one valid value per dimension, the method continues at step 138 with the processor 805 searching solutions for the next dimension in the list, and the method continues at step 142 with the processor 805 starting search solutions for a dimension. In various embodiments, the method may repeat.

Figure 9:
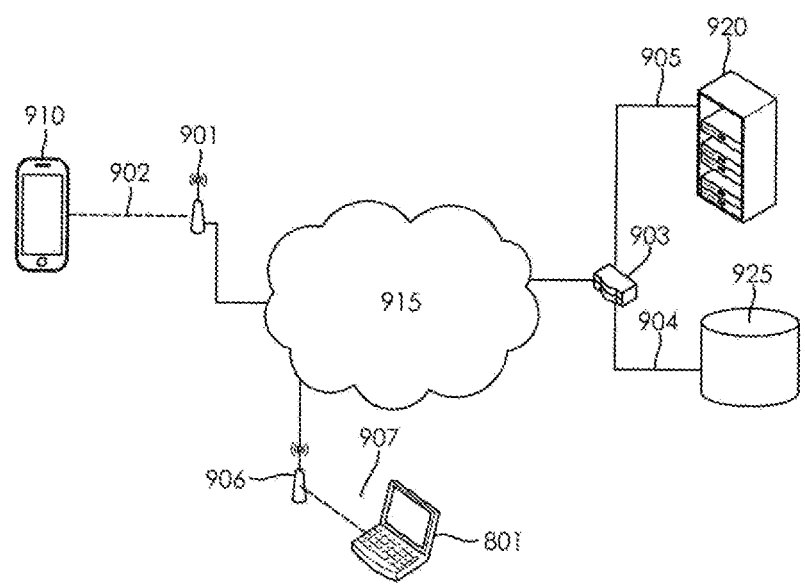
FIG. 9 illustrates a network diagram of an exemplary resource and attribute tasking network configured with an embodiment resource and attribute tasking system.

FIG. 9 illustrates a network diagram of an exemplary resource and attribute tasking network configured with an embodiment resource and attribute tasking system. In FIG. 9, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 9, a schematic overview of a system in accordance with an embodiment of the present disclosure is shown. In the depicted embodiment, an exemplary network includes the exemplary resource and attribute tasking system 801 configured to construct a resource and attribute tasking solution to complete a user's objective with resource and attribute characteristics defining the tasked resources and attributes, in response to receiving a task definition, and satisfying a task definition constraint. In the illustrated embodiment, the resource and attribute tasking system 801 is a computing device configured to construct a resource and attribute tasking solution to complete a user's objective with resource and attribute characteristics defining the tasked resources and attributes, in response to receiving a task definition, and satisfying a task definition constraint. In the depicted embodiment, the Integrated Capacity Management system 920 is a computing server configured to map demand to supply by modeling the supply as a hierarchy of objects with attributes and resources, expressing the demand resources and required attributes in terms of the supply model capable of managing reserved and provisioned capacity, and automatically deploy and configure resource supply to satisfy demand. In the depicted example, the mobile device 910 is a smartphone configured to enable a user to access and control the Integrated Capacity Management system 920 and the resource and attribute tasking system 801. In the illustrated embodiment, the mobile device 910 is communicatively and operably coupled by the wireless access point 901 and the wireless link 902 with the network cloud 915 (e.g., the Internet) to send, retrieve, or manipulate information in storage devices, servers, and network components, and exchange information with various other systems and devices via the network cloud 915. In the depicted example, the illustrative system includes the router 903 configured to communicatively and operably couple the container database 925 to the network cloud 915 via the communication link 904. In the illustrated example, the router 903 also communicatively and operably couples the Integrated Capacity Management system 920 to the network cloud 915 via the communication link 905. In the depicted embodiment, the exemplary resource and attribute tasking system 801 is communicatively and operably coupled with the network cloud 915 by the wireless access point 906 and the wireless communication link 907. In various examples, one or more of: the resource and attribute tasking system 801, mobile device 910, Integrated Capacity Management system 920, or container database 925 may include an application server configured to store or provide access to information used by the system. In various embodiments, one or more application server may retrieve or manipulate information in storage devices and exchange information through the network cloud 915. In some examples, one or more of: the resource and attribute tasking system 801, mobile device 910, Integrated Capacity Management system 920, or container database 925 may include various applications implemented as processor-executable program instructions. In some embodiments, various processor-executable program instruction applications may also be used to manipulate information stored remotely and process and analyze data stored remotely across the network cloud 915 (e.g., the Internet). According to an exemplary embodiment, as shown in FIG. 9, exchange of information through the network cloud 915 or other network may occur through one or more high speed connections. In some cases, high speed connections may be over-the-air (OTA), passed through networked systems, directly connected to one or more network cloud 915 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 915 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the resource and attribute tasking system 801, mobile device 910, Integrated Capacity Management system 920, or container database 925 via the network cloud 915 or other network in numerous ways. For instance, a component or module may connect to the system i) through a computing device directly connected to the network cloud 915, ii) through a computing device connected to the network cloud 915 through a routing device, or iii) through a computing device connected to a wireless access point. One of ordinary skill in the art will appreciate that there are numerous ways that a component or module may connect to a device via network cloud 915 or other network, and embodiments of the present disclosure are contemplated for use with any network connection method. In various examples, one or more of: the resource and attribute tasking system 801, mobile device 910, Integrated Capacity Management system 920, or container database 925 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

According to an embodiment of the present invention, the system is configured to provide a fleet management solution by adding the following unique capabilities on top of any configuration management platforms: committed capacity and configuration tracking, sizing, availability, and security promises made to customers; allocated capacity and configuration tracking—sizing, availability, and security configuration deployed on existent databases; and utilized capacity and configuration tracking—sizing, availability, and security configuration utilized by the existent databases.

Embodiments of the system may be configured to provide a unique and robust approach to integrated capacity management, allowing for keeping of commitments to customers. This is accomplished by modeling supply and demand, as well as providing a reservation system. By modeling demand and linking with the Service Catalog, the system may accept database demand requests that are compliant with pre-defined and certified enterprise database patterns. This eliminates human errors during demand capture and initial database buildout. By modeling supply and linking with the service catalog, the system allow builds that conform with pre-defined and certified enterprise database patterns and follow placement rules defined in the demand request. In this manner, the system provides a flexible reservation system that enables straight-through or differed buildout of capacity.

In a preferred embodiment of the present invention, the system is configured to provide: support for both physical and logical isolation through combination of modeling and labeling; support for enterprise engineering and cybersecurity policies through the catalog and patterns; integration of capacity management into every phase of database lifecycle (e.g., plan, build, operate, and decommission); and fleet-level configuration management through centralized configuration management and patterns.

Various embodiment implementations may solve such problems as: 'enumerate all possible values of each variable given the requirements (which could be no requirement, or, in an illustrative non-limiting example, var1=(xxx or zzz), var2>10, var3=yyy) . . . And to do this quickly. In an illustrative example, some prior art catalogs may require a user to answer questions in order (i.e. car make, model, year) before being able to determine available other options. However, some embodiment designs include advanced algorithms increasing the speed of enumerating all possible valid choices. Various examples of embodiment implementation designs may be based on the insight, that we don't need to enumerate all valid choices: just the union of all valid choices, thus allowing for optimizations.

Some embodiments may allow a user to specify any requirement in any order (for example, a red car over 6000 lb gross vehicle weight with 3 seats in the middle row: what are the available makes?). In an illustrative example, such order-independent requirement specification may allow for different views based on the customer (for example, basic user vs advanced user, vs returning user), and may allow one to enter their real requirements as opposed to answering the questions in order of how a manufacturer database was setup.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one computing device, special-purpose computer, programmable data processing apparatus, processor, processor architecture, and so on. In preferred embodiments of the present invention, multiple computing devices can be operably linked to form a computer network in a manner as to distribute and share one or more resources, such as clustered computing devices and server banks/farms.

Various examples of such multi-unit computer networks suitable for embodiments of the disclosure, their typical configuration and many standardized communication links are well known to one skilled in the art.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured, and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

According to an exemplary embodiment, exchange of information through a WAN or other network may occur through one or more high speed connections. In some cases, high speed connections may be over-the-air (OTA), passed through networked systems, directly connected to one or more WANs or directed through one or more routers. Router(s) are completely optional and other embodiments in accordance with the present disclosure may or may not utilize one or more routers. One of ordinary skill in the art would appreciate that there are numerous ways server or group of servers may connect to a WAN for the exchange of information, and embodiments of the present disclosure are contemplated for use with any method for connecting to networks for the purpose of exchanging information. Further, while this application refers to high speed connections, embodiments of the present disclosure may be utilized with connections of any speed.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer (or numerous linked computers or other distributed systems) involved, a computer program can be loaded onto one or more computers to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation Go, C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:
1. A process, comprising:
   a rules engine, comprising:
      receiving a tasking request to assign available resources and attributes to a task, the tasking request comprising:
         a plurality of possible resource and attribute parameter values, comprising a first dimension set including a first plurality of dimensions;
         at least one rule relating a valid combination of the possible resource and attribute parameter values; and,
         a first constraint on the possible resource and attribute parameter values, comprising a second dimension set including a second plurality of dimensions, wherein the at least one rule is based on the first constraint; and,
      sending a tasking response comprising a tasked resource and attribute definition included in a tasking solution constructed to assign available resources and attributes to the task, wherein:
         the tasked resource and attributes are defined by valid resource and attribute parameter values;
         the tasking solution is constructed as a function of the at least one rule relating a valid combination of the possible resource and attribute parameter values that satisfies additional constraints of the possible resource and attribute parameter values, wherein the additional constraints are based on the at least one rule;
         the tasking solution is constructed based on determining the union of only valid resource and attribute parameter value combinations that satisfy the at least one rule based on the additional constraints; and
         the tasking solution is constructed based on storing only a union of all valid resource and attribute parameter value combinations without storing all valid resource and attribute parameter value combinations.

2. The process of claim 1, in which the union of all valid resource and attribute parameter value combinations satisfying the at least one rule is determined as a function of evaluating only rules that could have fired based on the additional constraints.

3. The process of claim 1, in which the tasking request further comprises a parameter value constraint further limiting the possible resource and attribute parameter values included in the valid combination of the possible resource and attribute parameter values and the valid resource and attribute parameter values.

4. The process of claim 1, in which the tasking request further comprises a request that unresolved dimensions of the first or second dimension sets be resolved based on a default policy of the unresolved dimensions.

5. The process of claim 1, in which determining the union of all valid resource and attribute parameter value combinations satisfying the at least one rule further comprises resolving dimensions of the first or second dimension sets in a dimension resolution order based on a catalog file.

6. The process of claim 1, in which determining the union of all valid resource and attribute parameter value combinations satisfying the at least one rule further comprises resolving at least one dimension based on a global policy, and recalculating the tasking solution given a current solution and the new resolved value as the additional constraints, wherein the at least one dimension does not have a default policy.

7. The process of claim 1, in which the tasking request further comprises a default policy governing a first dimension set parameter value.

8. The process of claim 7, in which determining the union of all valid resource and attribute parameter value combinations satisfying the at least one rule further comprises setting a value based on the default policy, and recalculating the tasking solution given a current solution and a new default setting, as initial constraints for dimensions having multiple valid values and a default policy.

9. The process of claim 1, in which the tasking request further comprises an inequality constraint governing a second dimension set parameter value.

10. The process of claim 9, in which the union of all valid resource and attribute parameter value combinations satisfying the at least one rule is determined as a function of the inequality constraint.

11. The process of claim 1, in which the tasking request further comprises: a map of dimensions; and, an array of strings representing dimensions whose values should be returned.

12. The process of claim 1, in which the process further comprises determining a valid combination of the possible resource and attribute parameter values and the valid resource and attribute parameter values, based on evaluating the possible resource and attribute parameter values and the valid resource and attribute parameter values as a function of the at least one rule.

13. The process of claim 1, in which determining the union of all valid resource and attribute parameter value combinations satisfying the at least one rule further comprises evaluating a first value included in a dimension reordered as a function of a relative number of times the dimension appears in rule antecedents of the tasking request.

14. The process of claim 13, wherein, a dimension appearing in a rule antecedent is down-weighted by a number of dimensions in an antecedent and dimensions are ordered by a relative sum of weights.

15. The process of claim 1, in which determining the union of all valid resource and attribute parameter value combinations satisfying the at least one rule further comprises: generating a rule contrapositive to the at least one rule; and, in response to a determination a search space can be reduced based on evaluation of a contrapositive rule, eliminating at least one value in at least one dimension from a valid solution space.

16. The process of claim 1, in which the process further comprises validating the tasking request based on rules related by a tabular construct including valid combinations of dimensions and values.

17. The process of claim 16, in which the tabular construct is evaluated based on an additional rule specifying if rules are applicable based on the tabular construct.

18. A process, comprising:
a rules engine, comprising:
receiving a tasking request to assign available resources and attributes to a task, the tasking request comprising:
a plurality of possible resource and attribute parameter values, comprising a first dimension set including a first plurality of dimensions;
at least one rule relating a valid combination of the possible resource and attribute parameter values;
a first constraint on the possible resource and attribute parameter values, comprising a second dimension set including a second plurality of dimensions, wherein the at least one rule is based on the first constraint; and,
at least one tabular construct including valid combinations of dimensions and values; and,
constructing a tasking solution as a function of the at least one tabular construct, the tasking solution including a tasked resource and attribute definition assigning available resources and attributes to the task, comprising:
validating the tasking request based on rules related by the at least one tabular construct including valid combinations of dimensions and values;
determining at least one valid combination of the possible resource and attribute parameter values that satisfies additional constraints of the possible resource and attribute parameter values, based on evaluating the possible resource and attribute parameter values and the additional constraints as a function of the at least one rule; and,
determining the union of only valid resource and attribute parameter value combinations that satisfy the at least one rule and the at least one tabular construct as a function of evaluating only rules that could have fired based on the additional constraints, comprising:
generating a rule contrapositive to the at least one rule;
in response to a determination the search space can be reduced, based on evaluation of the contrapositive rule, eliminating values in at least one dimension from the valid solution space;
evaluating a first value included in a dimension reordered as a function of a relative number of times the dimension appears in rule antecedents of the tasking request; and constructing the tasking solution based on storing only a union of all valid resource and attribute parameter value combinations without storing all valid resource and attribute parameter value combinations.

19. The process of claim 18, in which the tasking request further comprises a request that unresolved dimensions of the first or second dimension sets be resolved based on a default policy of the unresolved dimensions.

20. The process of claim 18, in which determining the union of all valid resource and attribute parameter value combinations satisfying the at least one rule further comprises resolving at least one dimension based on a global policy, and recalculating the tasking solution given a current solution and the new resolved value as the additional constraints, wherein the at least one dimension does not have a default policy.

21. The process of claim 18, in which the tasking request further comprises a default policy governing a first dimension set parameter value.

22. The process of claim 21, in which determining the union of all valid resource and attribute parameter value combinations satisfying the at least one rule further comprises setting a value based on the default policy, and recalculating the tasking solution given a current solution and a new default setting, as initial constraints for dimensions having multiple valid values and a default policy.

23. The process of claim 18, in which the tasking request further comprises an inequality constraint governing a second dimension set parameter value.

24. The process of claim 23, in which determining the union of all valid resource and attribute parameter value combinations satisfying the at least one rule is determined as a function of the inequality constraint.

25. The process of claim 18, in which the process further comprises: for each value of each dimension not yet determined as true or false for the rules that could have fired, posit the value as true or false, and determine what other values are reducible based on evaluation of the contrapositive rule, based on positing the value as true or false.

26. The process of claim 18, in which the process further comprises: upon a determination that a rule of the rules that could have been fired has a true antecedent that is determined true for the rules that could have fired, but a consequent reduces valid values out of a given dimension, terminating rule evaluation for that given dimension.

27. The process of claim 18, in which the process further comprises skipping dimensions in which all values of the skipped dimensions are valid after one solution is found.

28. The process of claim 18, in which validating the tasking request further comprises creating a hidden dimension to satisfy tabular constraints for each tabular construct row.

29. The process of claim 18, in which the tasking request further comprises a tabular construct valid value expressed as the negation of one or more value.

30. The process of claim 18, in which the tasking request further comprises a tabular construct including a predetermined constraint applicable under a predetermined condition.

31. A process, comprising:
 a rules engine, comprising:
  receiving a tasking request to assign available resource and attributes to a task, the tasking request comprising:
   a plurality of possible resource and attribute parameter values, comprising a first dimension set including a first plurality of dimensions;
   at least one rule relating a valid combination of the possible resource and attribute parameter values;
   a first constraint on the possible resource and attribute parameter values, comprising a second dimension set including a second plurality of dimensions, wherein the at least one rule is based on the first constraint; and,
   at least one tabular construct including valid combinations of dimensions and values; and,
  constructing a tasking solution as a function of the at least one tabular construct, the tasking solution including a tasked resource and attribute definition assigning available resources and attributes to the task, comprising:
   validating the tasking request based on rules related by the at least one tabular construct including valid combinations of dimensions and values, wherein the tasking request further comprises a tabular construct valid value expressed as the negation of one or more value, and wherein the at least one tabular construct included in the tasking request further comprises a predetermined constraint applicable under a predetermined condition, and wherein validating the tasking request further comprises creating a hidden dimension to satisfy tabular constraints for each tabular construct row;
   determining at least one valid combination of the possible resource and attribute parameter values that satisfies additional constraints of the possible resource and attribute parameter values, based on evaluating the possible resource and attribute parameter values and the additional constraints as a function of the at least one rule; and,
   determining the union of only valid resource and attribute parameter value combinations that satisfy the at least one rule and at least one tabular construct, comprising:
    generating at least one rule contrapositive to the at least one rule based on the additional constraints;
    in response to a determination the search space can be reduced based on evaluation of the contrapositive rule, eliminating values in at least one dimension from the valid solution space;
    determining values that can be reduced, based on positing as true or false each value of each dimension evaluated as a function of the at least one rule for each value of each dimension that is indeterminate as true or false;
    upon a determination that a rule has a true antecedent, but a consequent reduces valid values out of a given dimension, terminating rule evaluation for that given dimension;
    upon a determination all values included in a given dimension are valid, skipping evaluation of the given dimension after one solution is found; and,
    evaluating a first value included in a dimension reordered as a function of a relative number of times the dimension appears in rule antecedents of the tasking request; and constructing the tasking solution based on storing only a union of all valid resource and attribute parameter value combinations without storing all valid resource and attribute parameter value combinations.

32. The process of claim 31, in which the tasking request further comprises a default policy governing a first dimension set parameter value; and, determining the union of all valid resource and attribute parameter value combinations satisfying the at least one rule further comprises setting a value based on the default policy of each dimension if the default policy is present or a global policy if no default policy is present, and recalculating the tasking solution given a current solution and a new default setting, as initial constraints for dimensions having multiple valid values.

33. The process of claim 31, in which the union of all valid resource and attribute parameter value combinations satisfying the at least one rule is determined as a function of the inequality constraint.

34. The process of claim 31, in which the tasking request includes a request to map supply to demand based on supply resources modeled as a hierarchy of objects with attributes and resources, wherein demand resources and required attributes are defined in terms of a supply model capable of managing reserved and provisioned capacity.

35. The process of claim 34, in which determining the union of all valid resource and attribute parameter value combinations further comprises the rules engine deriving a supply pattern comprising a template to create supply on-demand.

36. The process of claim 35, in which the process further comprises provisioning, by a Provisioning Engine, an on-demand supply.

* * * * *